US012656323B2

(12) United States Patent
Fogwill et al.

(10) Patent No.: US 12,656,323 B2
(45) Date of Patent: Jun. 16, 2026

(54) FLUIDIC CONFIGURATION FOR A MULTIDIMENSIONAL LIQUID CHROMATOGRAPHY SYSTEM

(71) Applicant: Waters Technologies Corporation, Milford, MA (US)

(72) Inventors: Michael O. Fogwill, Uxbridge, MA (US); Sylvain Gilles Cormier, Mendon, MA (US); Thomas Swann, Hopedale, MA (US); Francis Patrick Tracey, Jericho, VT (US)

(73) Assignee: Waters Technologies Corporation, Milford, MA (US)

( * ) Notice: Subject to any disclaimer, the term of this patent is extended or adjusted under 35 U.S.C. 154(b) by 417 days.

(21) Appl. No.: 18/358,224

(22) Filed: Jul. 25, 2023

(65) Prior Publication Data

US 2023/0366858 A1 Nov. 16, 2023

Related U.S. Application Data

(63) Continuation of application No. 17/307,389, filed on May 4, 2021, now Pat. No. 11,747,312.

(60) Provisional application No. 63/021,396, filed on May 7, 2020.

(51) Int. Cl.
*G01N 30/46* (2006.01)
*G01N 30/02* (2006.01)

(52) U.S. Cl.
CPC ......... *G01N 30/468* (2013.01); *G01N 30/463* (2013.01); *G01N 2030/027* (2013.01)

(58) Field of Classification Search
CPC ........... G01N 2030/027; G01N 30/463; G01N 30/468
See application file for complete search history.

(56) References Cited

U.S. PATENT DOCUMENTS

| | | | |
|---|---|---|---|
| 5,131,998 A | 7/1992 | Jorgenson et al. | |
| 5,240,577 A | 8/1993 | Jorgenson et al. | |
| 2003/0168392 A1 | 9/2003 | Masuda et al. | |
| 2010/0171055 A1 | 7/2010 | Dourdeville | |
| 2012/0262178 A1* | 10/2012 | Dourdeville | G01R 33/307 324/321 |
| 2014/0014585 A1* | 1/2014 | Dourdeville | G01N 30/04 210/656 |

(Continued)

OTHER PUBLICATIONS

Extended Search Report in European Patent Application No. 25173657.5 mailed on Jul. 22, 2025.

(Continued)

*Primary Examiner* — David L Singer
(74) *Attorney, Agent, or Firm* — Schmeiser, Olsen & Watts LLP

(57) ABSTRACT

Multidimensional liquid chromatography (MDLC) systems include valve configurations that enable a flow containing analytes in the eluent of a first dimension liquid chromatography system to be modulated such that the analytes can be captured in fluidic loops and subsequently provided to a second dimension liquid chromatography system. Optionally, a single detector is used for both first and second dimensions. In addition, the systems can enable dilution of the analytes and enable incompatible mobile phases and mobile phase flow rates to be used in the first and second dimensions.

19 Claims, 25 Drawing Sheets

(56)                    References Cited

U.S. PATENT DOCUMENTS

| | | | |
|---|---|---|---|
| 2015/0177199 A1* | 6/2015 | Borbely | G01N 30/468 |
| | | | 73/61.55 |
| 2015/0346168 A1 | 12/2015 | Ciavarini et al. | |
| 2016/0238573 A1* | 8/2016 | Venkatramani | G01N 30/462 |
| 2017/0131244 A1 | 5/2017 | Witt et al. | |
| 2017/0184553 A1 | 6/2017 | Sims | |
| 2017/0209811 A1 | 7/2017 | Dlugasch et al. | |
| 2017/0209812 A1 | 7/2017 | Dlugasch et al. | |
| 2018/0128795 A1 | 5/2018 | Organ et al. | |
| 2018/0196019 A1 | 7/2018 | Fogwill et al. | |
| 2020/0064313 A1 | 2/2020 | Cormier et al. | |
| 2020/0072800 A1 | 3/2020 | Cormier et al. | |
| 2021/0404996 A1 | 12/2021 | Fogwill | |

OTHER PUBLICATIONS

International Search Report and Written Opinion in PCT/US2021/030600 mailed on Jul. 29, 2021.

Bushey, Michelle M. and James W. Jorgenson, "Automated Instrumentation for Comprehensive Two-Dimensional High-Performance Liquid Chromatography/Capillary Zone Electrophoresis," Analytical Chemistry, American Chemical Society, vo. 62, No. 10, May 15, 1990, pp. 978-984.

Bushey, Michelle M. and James W. Jorgenson, "Automated Instrumentation for Comprehensive Two-Dimensional High-Performance Liquid Chromatography of Proteins," Analytical Chemistry, American Chemical Society, vo. 62, Jan. 15, 1990, pp. 161-167.

International Preliminary Report on Patentability in International Application No. PCT/US2021/030600 mailed on Nov. 17, 2022.

Notice of Allowance in U.S. Appl. No. 17/307,389 mailed on Apr. 17, 2023.

Final Office Action in U.S. Appl. No. 17/307,389 mailed on Dec. 1, 2022.

Menin, "Why it's Important to Always Use Tolerances," Design World, 2012.

Valco Instruments Co. Inc., "Tubing for Chromatography" catalog, 2010.

Idex, "Tubing" catalog, 2011.

Non-Final Office Action in U.S. Appl. No. 17/307,389 mailed on Sep. 2, 2022.

Breadmore, et al. "Teh modulator in Comprehensive Two-Dimesional Liquid Chromatography," LCGC Europe, May 1, 2016, vol. 29, Iss. 5, pp. 268-276.

Moriarty, "Bench Tips: HPLC TLC: Keeping Your Chromatography System in Tip-Top Condition," Biocompare, 2013.

* cited by examiner

FLUIDIC CONFIGURATION FOR A MULTIDIMENSIONAL LIQUID CHROMATOGRAPHY SYSTEM

RELATED APPLICATION

This application is a continuation of U.S. patent application Ser. No. 17/307,389 filed May 4, 2021 and titled "Fluidic Configuration for a Multidimensional Liquid Chromatography System," which claims the benefit of the earlier filing date of U.S. Provisional Patent Application Ser. No. 63/021,396 filed May 7, 2020 and titled "Multidimensional Liquid Chromatography System," the entireties of which are incorporated herein by reference.

FIELD OF THE INVENTION

The present disclosure relates generally to liquid chromatography systems and more particularly, to systems and methods for performing multidimensional liquid chromatography.

BACKGROUND

Multidimensional liquid chromatography (MDLC) is often used to address chromatography separation problems arising in challenging chemical separations. Notwithstanding, limitations exist which prevent broad deployment and acceptance of MDLC. For example, a conventional MDLC system may have multiple system modules which result in a large instrument. In addition, MDLC systems commonly include separate, dedicated detectors for the first and second dimensions. Consequently, even if the detectors are of the same type, there is no accurate ability to measure modulation efficiency due to subtle differences in detector response. Furthermore, systems configured for MDLC-MS (mass spectrometry) with the MS on the second dimension are only used for MDLC-MS separations and replumbing of such systems is required to switch between MDLC-MS operation and single dimension LCMS operation.

Another common problem with MDLC systems is based on the timing associated with switching of the modulator valve. Actuation of a modulator valve should account for the volume of interconnect tubing between the detector and the collection device. In addition, the valve actuations can cause pressure pulses that may result in detector baseline disturbances.

The modulator portion of the MDLC system can limit the types of separations that may be coupled together. More specifically, the mobile phases and/or flow rates of the different dimensions may not be compatible within the MLDC system.

In addition to the above, method creation for MDLC systems is challenging. Control of such systems is typically limited to expert users.

SUMMARY

In an aspect of the present disclosure, a multidimensional liquid chromatography system includes a switching valve operable in at least two valve states, a detector, a routing valve and a first fluidic loop valve. The detector is in communication with the switching valve through a first fluidic path and the routing valve is in communication with the switching valve through a second fluidic path. The first fluidic loop valve is in communication with the routing valve through a third fluidic path. A volume of the first fluidic path is equal to a sum of a volume of the second fluidic path and a volume of the third fluidic path.

The first fluidic loop valve may have a plurality of sample fluidic loops each coupled to a respective pair of ports of the first fluidic loop switching valve.

The multidimensional liquid chromatography system may include a second fluidic loop valve in communication with the routing valve through a fourth fluidic path and wherein the volume of the first fluidic path is equal to a sum of the volume of the second fluidic path and a volume of the fourth fluidic path. The volume of the third fluid path may equal the volume of the fourth fluidic path. The second fluidic loop valve may have a plurality of sample fluidic loops each coupled to a respective pair of ports of the second fluidic loop switching valve.

The fluidic paths may be defined by tubing. The tubing may be fused silica tubing. A difference in the volume of the first fluidic path from the sum of the volumes of the second and third fluidic paths may not exceed a volume variation based on a manufacturing tolerance of the tubing. The tubing of one of the fluidic paths may have a diameter that is different than a diameter of the tubing of another one of the fluidic paths.

When the switching valve is in a first valve state, a liquid received at a first port of the switching valve may flow to the detector and, when the switching valve is in a second valve state, the liquid received at the first port may flow to the routing valve.

The multidimensional liquid chromatography system may include a first dimension column and a second dimension column in communication with the switching valve through a first port and a second port, respectively, of the switching valve.

A portion of the routing valve and the first and second fluidic loop valves may be formed in a diffusion-bonded stator array.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the technology.

DETAILED DESCRIPTION

Figure 1:
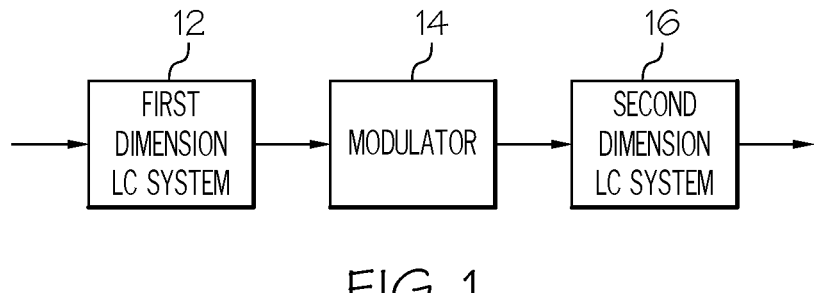
FIG. 1 is a schematic block diagram representing the functionality of an MDLC system.

Reference in the specification to an "example," "embodiment" or "implementation" means that a particular feature, structure or characteristic described in connection with the example, embodiment or implementation is included in at least one embodiment of the teaching. References to a particular example, embodiment or implementation within the specification do not necessarily all refer to the same embodiment.

As used herein, an analyte peak means an analyte that is present in an eluent from a chromatographic column and corresponds to the analyte represented by a corresponding peak in a chromatogram. Analyte peaks resulting from a chromatographic separation may be modulated for further separation by a chromatographic column corresponding to a second chromatography dimension. Modulation is the process in which a segment of the first dimension chromatographic separation is made compatible with the second dimension. Segments can be made compatible with the second dimension by temporally divorcing them from the first, by exchanging mobile phases, altering pH, removing salts, or by diluting the segment prior to introduction to the second dimension. The segment may include part of one or more analyte peaks that overlap in the first-dimension chromatogram with each peak comprising an analyte that is different from the analyte in the other peak. The segment may also contain no peaks in the first dimension, being defined instead by a retention time range. The segment may be collected for storage in a fluidic loop or on a trapping column. Modulation apparatus may also be comprised of one or more fluidic loops and one or more trapping columns arranged in series with associated valves for fluidic routing. In some instances, "cuts" or "slices" of an analyte peak may be individually stored, and it will be understood herein that such analyte slices can be processed by an MDLC in a manner similar to stored analyte peaks.

As used herein, a "trap column" means a chromatographic column that can be used to retain and subsequently elute a sample. The sample may be one or more analytes provided by a chromatographic separation. Generally, the trap column operates with two solvent conditions: one in which the solvent strength is sufficiently weak as to allow the sample to bind to the stationary phase of the trap column and the other in which the solvent strength is sufficient to cause the immediate and complete elution of the sample from the trap column.

As used herein, a "fluidic loop" means a fluidic storage volume, such as a channel volume, used to temporarily hold a quantity of liquid. For example, a fluidic loop may be used to hold a volume of liquid that includes an analyte peak or a volume of liquid corresponding to a slice of an analyte peak. The volume of the analyte peak or slice may be less than or equal to the volume of the fluidic loop. A fluidic loop may be externally coupled to a valve in the form of tubing. Alternatively, a fluidic loop may be coupled to a valve and formed as a channel or other volume within a solid structure, such as a diffusion-bonded structure as described below.

Typical MDLC systems require an instrument occupying a substantial volume. For example, such a system may require approximately one cubic meter and require significant laboratory bench space. MLDC systems described herein can have a substantially smaller volume and require substantially less bench space.

MDLC systems disclosed herein can be operated as a single-dimension liquid chromatography system, using either of two chromatographic columns, and can easily be reconfigured for two-dimensional chromatography when required by a particular sample. In an exemplary embodiment, a system can be operated as a single-dimension liquid chromatography system, using either of two chromatographic detectors, and can easily be reconfigured, by controlling valves, for two-dimensional chromatography when required by a particular sample. FIG. 1 shows a schematic block diagram representing the functionality of an MDLC system and includes a first-dimension liquid chromatography module 12, a modulator 14 and a second-dimension liquid chromatography module 16. The first- and second-dimension modules 12 and 16 may include one or more first-dimension chromatography columns and one or more second-dimension chromatography columns, respectively, and the modulator 14 may include one or more fluidic loops and/or one or more trapping columns. The MDLC system can be used to perform two-dimensional liquid chromatography where one or more analytes peaks or analyte slices from a first dimension separation are modulated via the modulator 14 so that each analyte peak or analyte slice from the first dimension may be separated in the second dimension.

Figure 2:
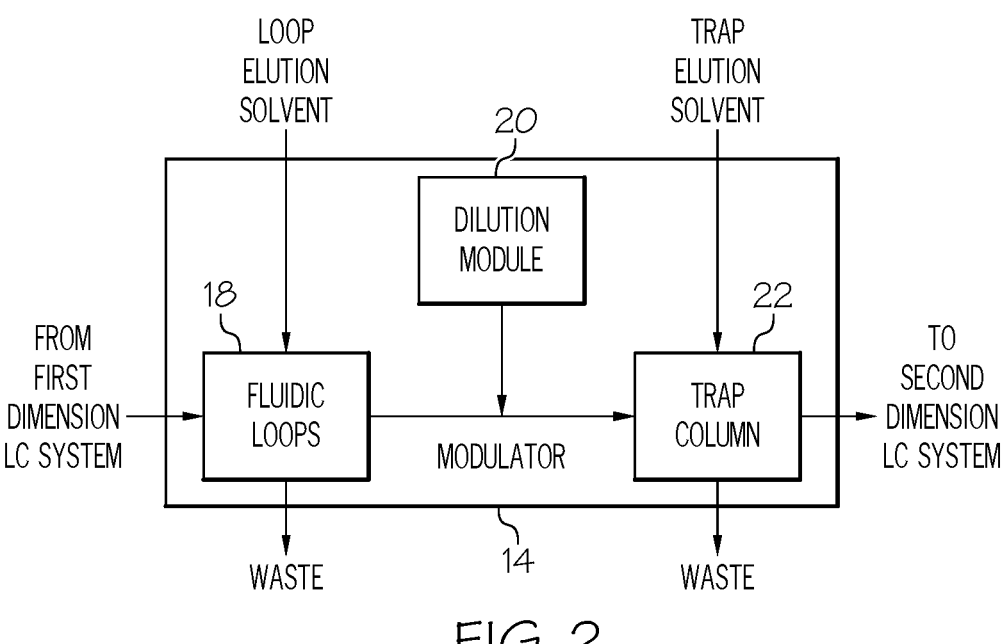
FIG. 2 is a block diagram of an embodiment of a modulator which includes fluidic loops used to capture and subsequently provide an analyte peak from a first dimension to a second dimension.

As shown in FIG. 2, in some embodiments the modulator 14 includes fluidic loops 18 each used to capture and subsequently provide an analyte peak from the first dimension to the second dimension. The modulator 14 may include a dilution module 20 and a trap column 22. The dilution module 20 provides a solvent that can be merged with a flow that includes an analyte peak from one of the fluidic loops to create a diluted analyte peak. The trap column 22 receives the flow (or diluted flow) from the fluidic loop and retains the analyte peak on a trap column. Subsequently, a trap elution solvent is provided to the trap column 22 to elute the analyte peak into a flow of the second-dimension liquid chromatography system.

The modulator 14 allows for use of a mobile phase in one dimension which may be incompatible for use in the other dimension. For example, hydrophilic interaction liquid chromatography (HILIC) may be performed with the first dimension and reverse phase liquid chromatography (RPLC) performed with the second dimension. Moreover, the flow rate of the mobile phase in one dimension does not affect the flow rate of the mobile phase used in the other dimension. For example, a semi-preparative column utilizing a higher mobile phase flow rate (e.g., 10 mL/min.) may be used in the first dimension while an analytical column utilizing a substantially lower mobile phase (e.g., 500 µL/min.) flow rate is used in the second dimension. The volume of a peak captured in the first dimension may be large (e.g., hundreds of microliters to tens of milliliters or larger).

Figure 3:
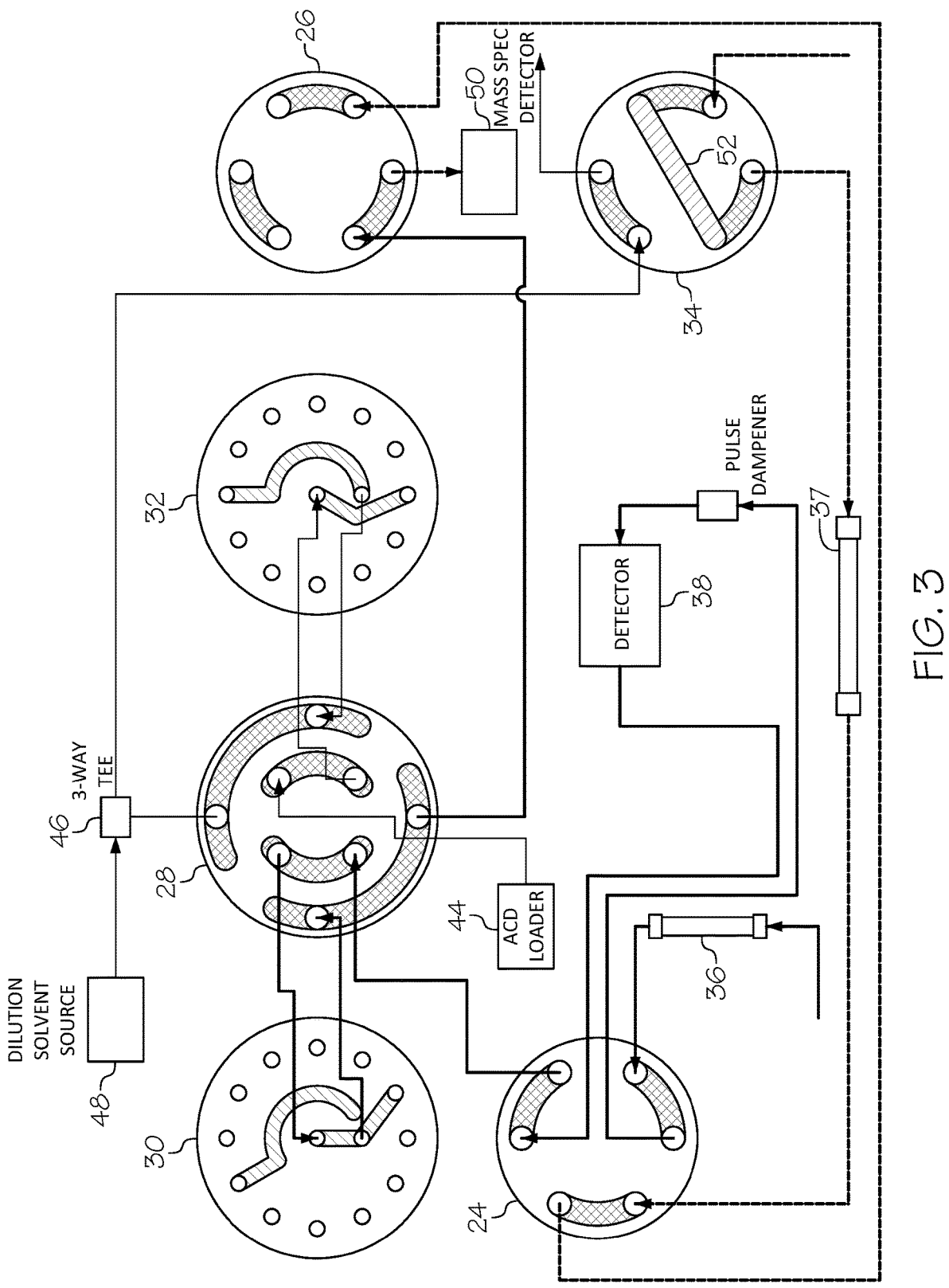
FIG. 3 to FIG. 6 are schematic diagrams of an embodiment of a MDLC system configured for performing various MDLC functions.

FIG. 3 is a schematic diagram of a MDLC system which includes a first switching valve 24, a second switching valve 26, a routing valve 28, a first fluidic loop valve 30, a second fluidic loop valve 32 and a trap valve 34. As illustrated, the valves are implemented as rotary shear valves having stator surfaces that interface with rotor surfaces although other valve types compatible with the solvents and pressures of the MDLC system are contemplated. The rotor surfaces have grooves shown as interconnecting arcs and/or line segments. Each valve can be rotated clockwise or counterclockwise to change its valve state and reconfigure fluidic paths through the valve.

The first switching valve 24 has two valve states. The first valve state is shown where the first switching valve 24 directs the eluent from a first-dimension column 36 to a detector 38 and directing the flow downstream from the detector 38 to the routing valve 28. By way of a non-limiting example, the detector 38 may be an optical detector such as an ultraviolet-visible (UV-Vis) or a photodiode array detector. In its second valve state (not shown), the first switching valve 24 allows the eluent from the first-dimension column 36 to bypass the detector 38 and flow directly to the routing valve 28.

Figure 7:
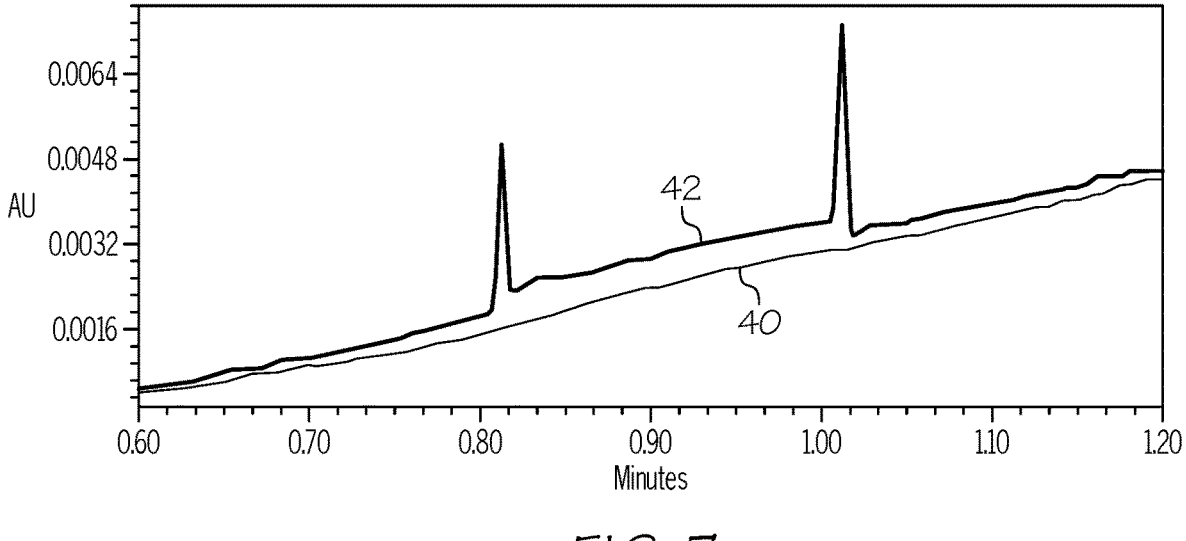
FIG. 7 shows a detector response from a UV-Vis detector for a MDLC system with a pulse dampener and a detector response for the same detector for the MDLC system without the pulse dampener.
Figure 8A:
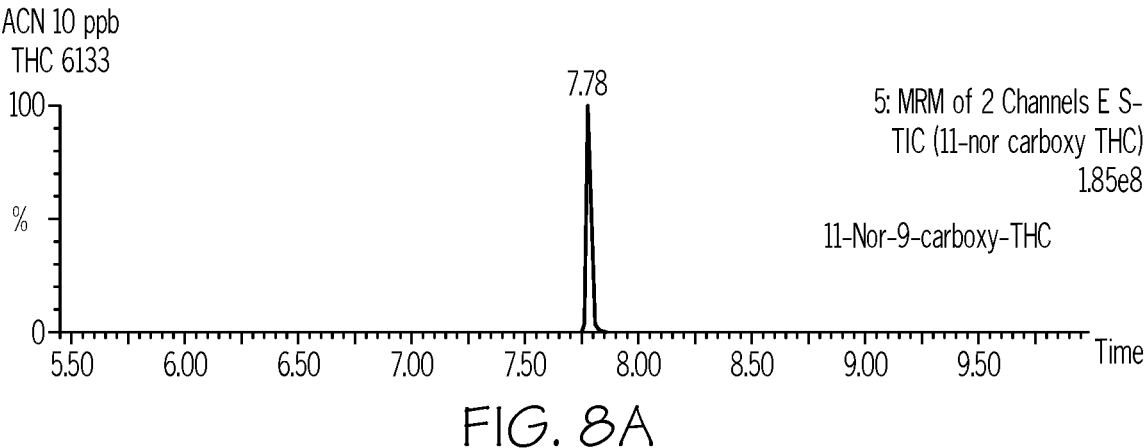
FIGS. 8A to 8F are chromatograms for separations performed with a simple fluidic tee and FIGS. 8G to 8L are chromatograms performed with a 50 μL mixing tee.
Figure 8B:
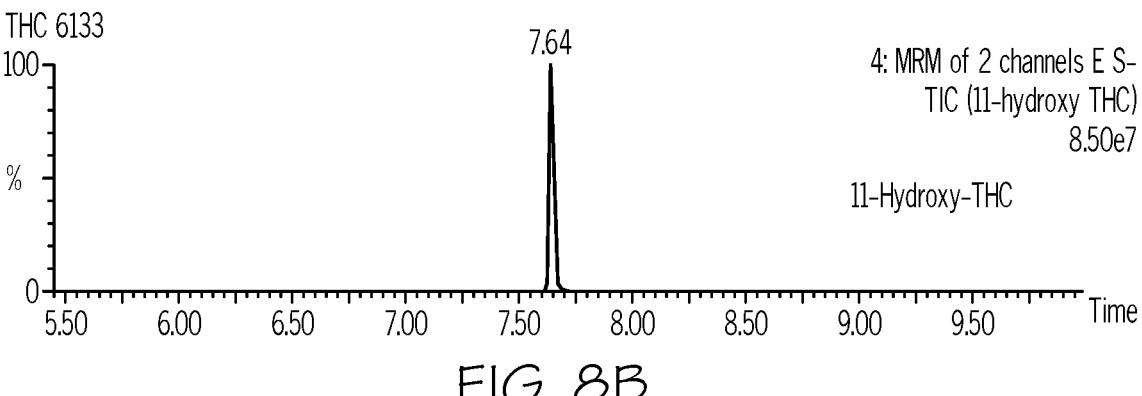
Figure 8C:
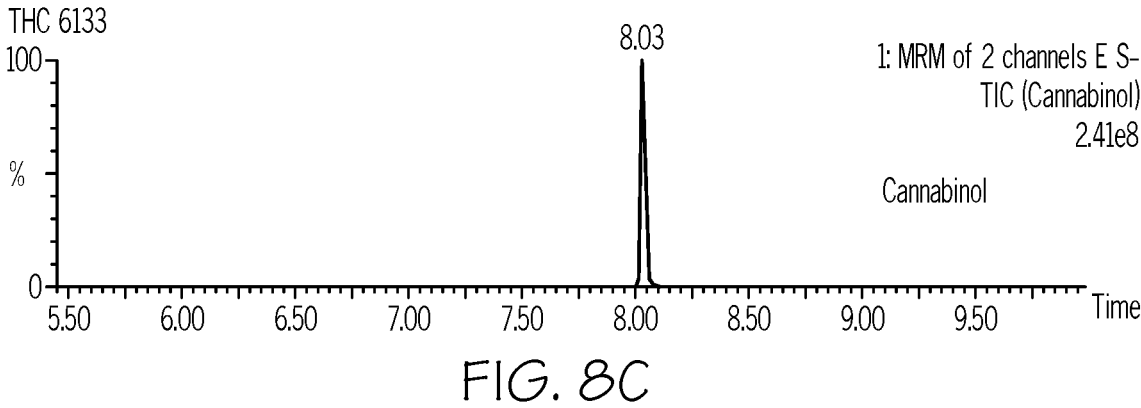
Figure 8D:
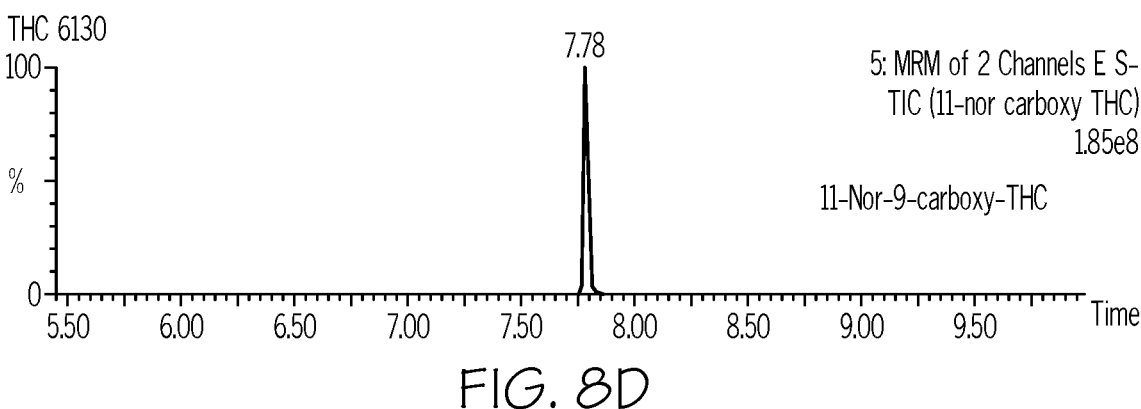
Figure 8E:
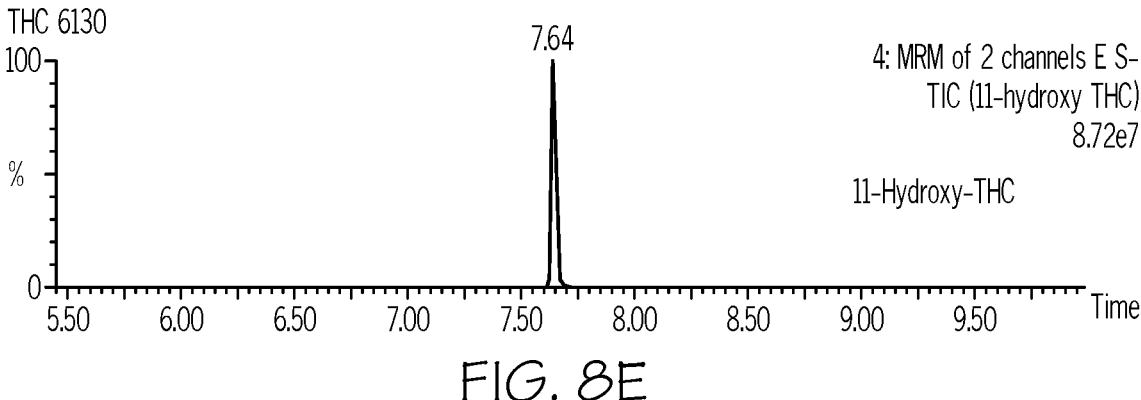
Figure 8F:
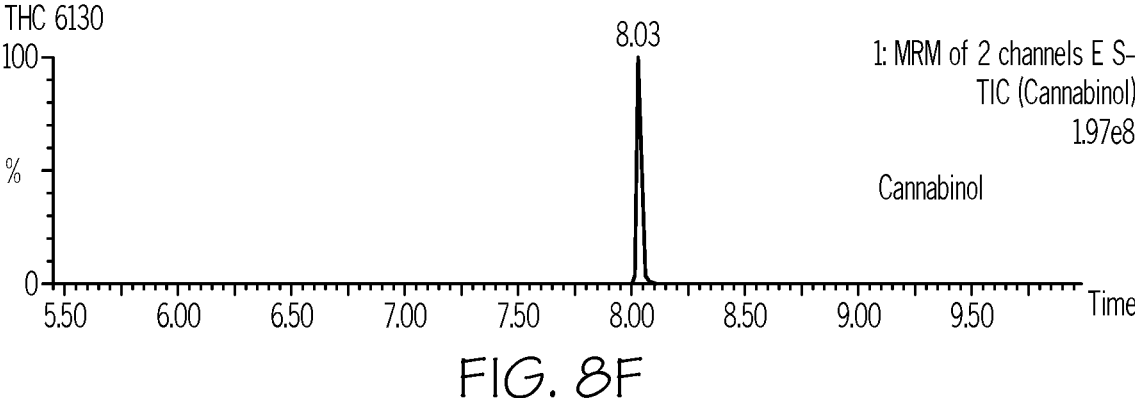
Figure 8G:
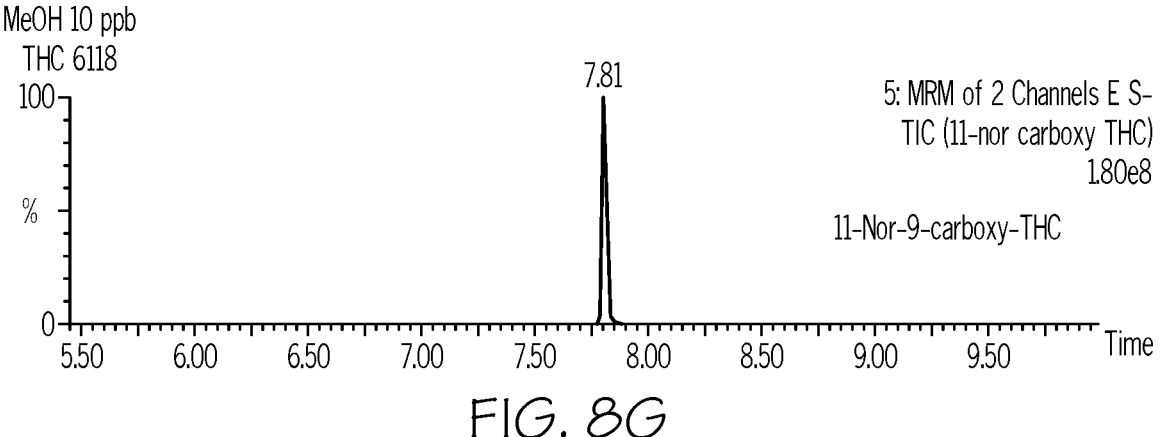
Figure 8H:
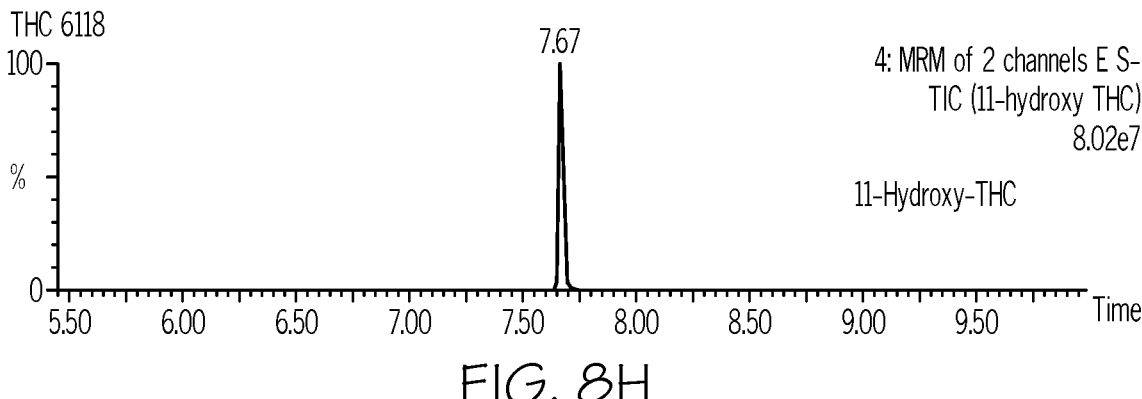
Figure 8I:
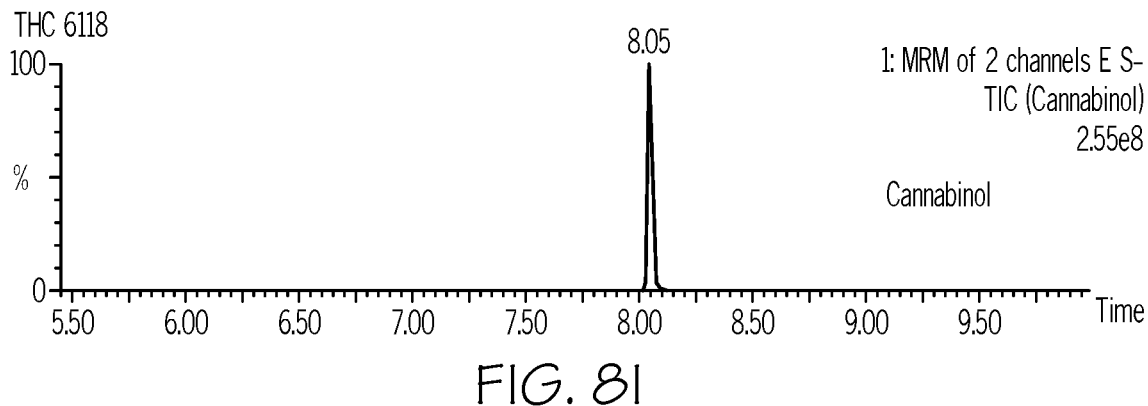
Figure 8J:
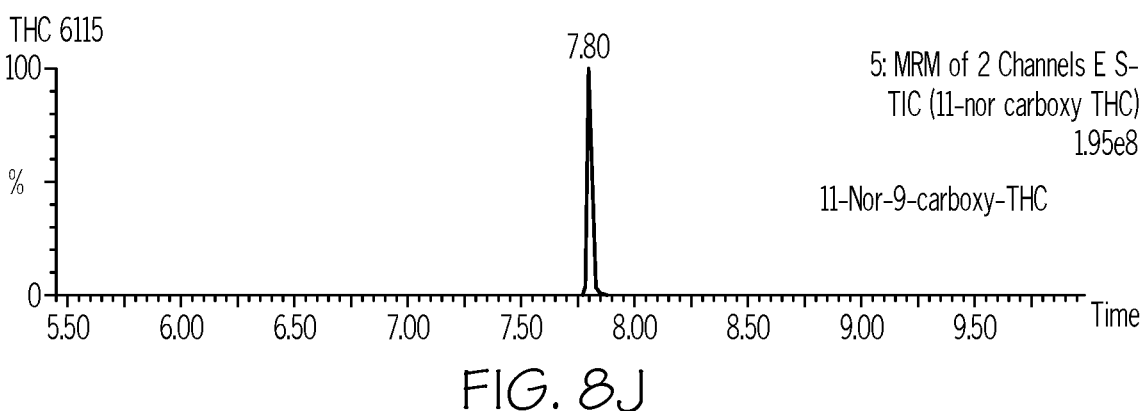
Figure 8K:
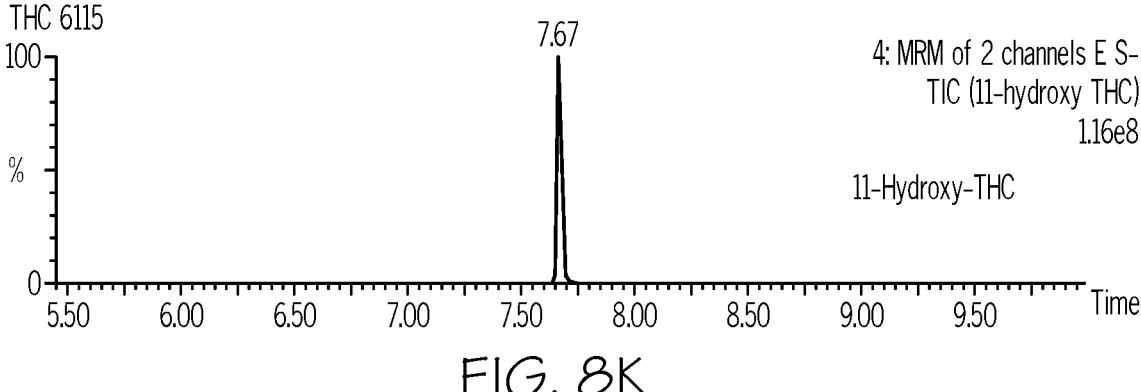
Figure 8L:
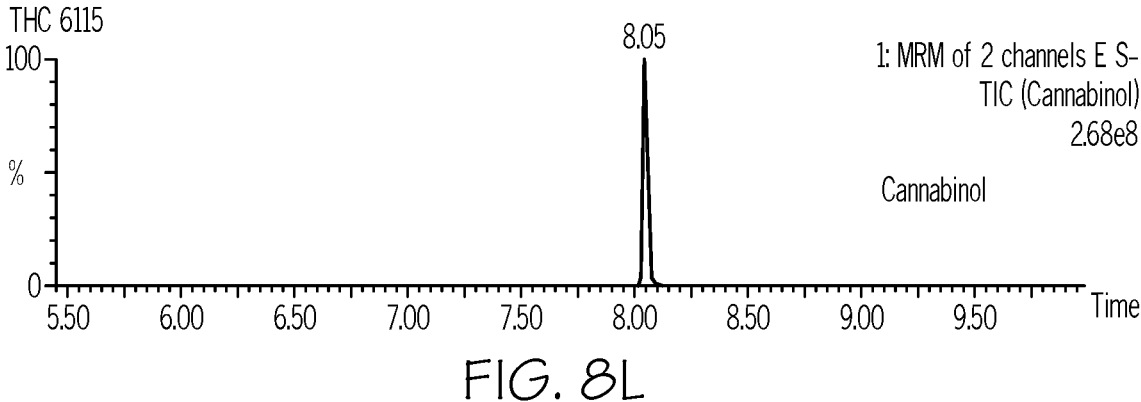

A pulse dampener is included in the fluidic path leading to the detector 38. The pulse dampener includes a fluidic volume that absorbs pressure pulses created from valve actuations. The pulse damper can be located in the fluidic path leading from the detector 38 to the routing valve 28. In a non-limiting example, the pulse damper also includes a pressure relief mechanism to prevent over-pressuring the detector. For example, FIG. 7 shows a detector response 40 from a UV-Vis detector for a system with a pulse dampener and a detector response 42 for the same detector for a system without the pulse dampener. The detector response 42 includes two peaks corresponding to two valve actuations which may cause system pressure disturbances. These two peaks degrade the detector baseline response and can limit performance of the MDLC system especially when a response peak occurs nearly simultaneous with the presence of an analyte in the flow at the detector. Alternatively, the response peaks may be interpreted as an analyte or impurity in the mobile phase.

Referring again to FIG. 3, the fluidic paths between the routing valve 28 and the first fluidic loop valve 30 have the same total volume, within manufacturing tolerances, to the total volume of the counterpart fluidic paths between the routing valve and the second fluidic loop valve 32.

The solvent source (ACD loader 44) provides a solvent to push a stored analyte peak from one of the twelve fluidic loops (not shown) to a three-way fluidic tee 46. The MDLC system includes a source 48 of a dilution solvent to enable at-column dilution (ACD) of the analyte peak. The dilution solvent is merged with the analyte peak at the fluidic tee 46 and the diluted analyte peak flows toward the trap valve 34.

In alternative embodiments, a mixing tee is used in place of the simple three-way fluidic tee 46. FIGS. 8A to 8L shows chromatograms for separations performed with a simple fluidic tee or a three-way 50 μL mixer (i.e., a mixing tee). The six chromatograms shown in FIGS. 8A to 8F were obtained with the simple fluidic tee with each chromatogram showing a particular sample. The chromatograms of FIGS. 8A to 8C correspond to analytes eluted from the first dimension in 100% acetonitrile. The chromatograms of FIGS. 8D to 8F correspond to the same analytes eluted from the first dimension in 100% methanol. The six chromatograms shown in FIGS. 8G to 8L were obtained with the mixing tee for the same samples and conditions used in the corresponding chromatograms of FIGS. 8A to 8F. The chromatograms obtained using the fluidic tee exhibit no observable shouldering or tailing and the peaks heights are closely matched to the peak heights for the chromatograms performed with the mixing tee. The comparison makes clear that performance is not significantly impacted by the mixing capability of the simple fluidic tee. Consequently, the simple fluidic tee may be preferred for some applications in which the internal composition of a mixing tee may result in problematic interaction with one or more analytes.

Reference is again made to FIG. 3. In one preferred implementation, portions of the routing valve 28 and the first and second fluidic loop valves 30 and 32 may be formed in a diffusion-bonded stator array. U.S. Patent Publication No. 2020/0064313, incorporated herein by reference, discloses examples of a stator array for a multi-valve system. The stator array includes a diffusion-bonded plate that includes stator surfaces each configured to receive a rotor surface of a corresponding rotary valve actuator. The stator array includes internal fluidic channels having accurately controlled dimensions. The channel volumes and the fluidic loops between stator ports of a stator surface are formed with small tolerances compared to conventional channels and fluidic loops implemented with external tubing.

During operation, the eluent from the first dimension column 36 received at the first switching valve 24 is either diverted through the detector 38 and then directed to the routing valve 28 or directly provided to the routing valve 28, depending on the valve state. The routing valve 28 is configured to provide the eluent to either the first or the second fluidic loop valve 30 or 32, respectively. The fluidic loop valves 30 or 32 can be configured in a bypass state such that the eluent flows back to the routing valve 28 or so that the received eluent passes through a sample fluidic loop that is coupled at each end to diametrically opposed stator ports. As illustrated, the first fluidic loop valve 24 is in its bypass state and is directing the flow back to the routing valve 28 which routes the flow to the second switching valve 26 and on to a mass spectrometer detector 50.

Figure 4:
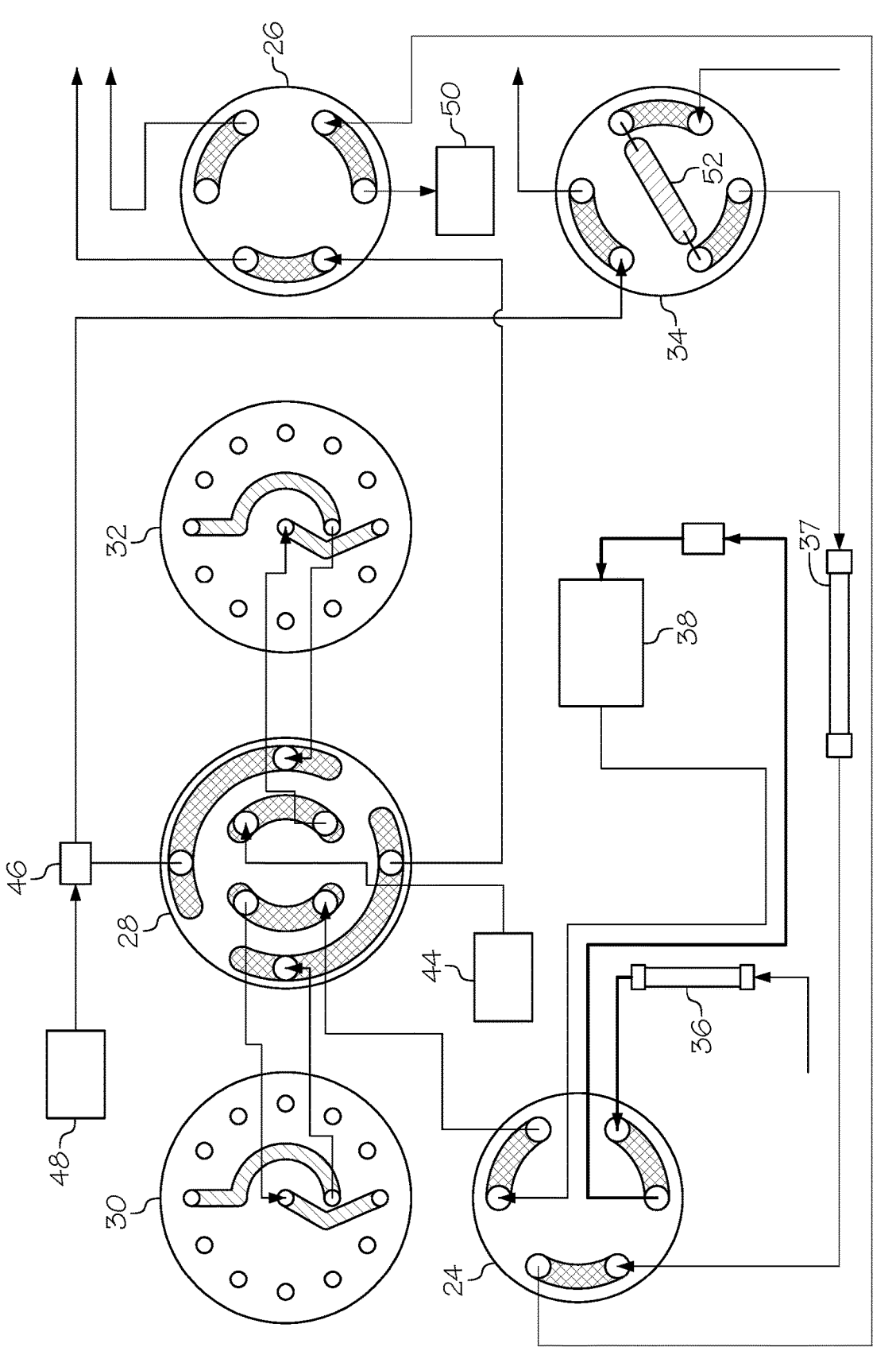
Figure 5:
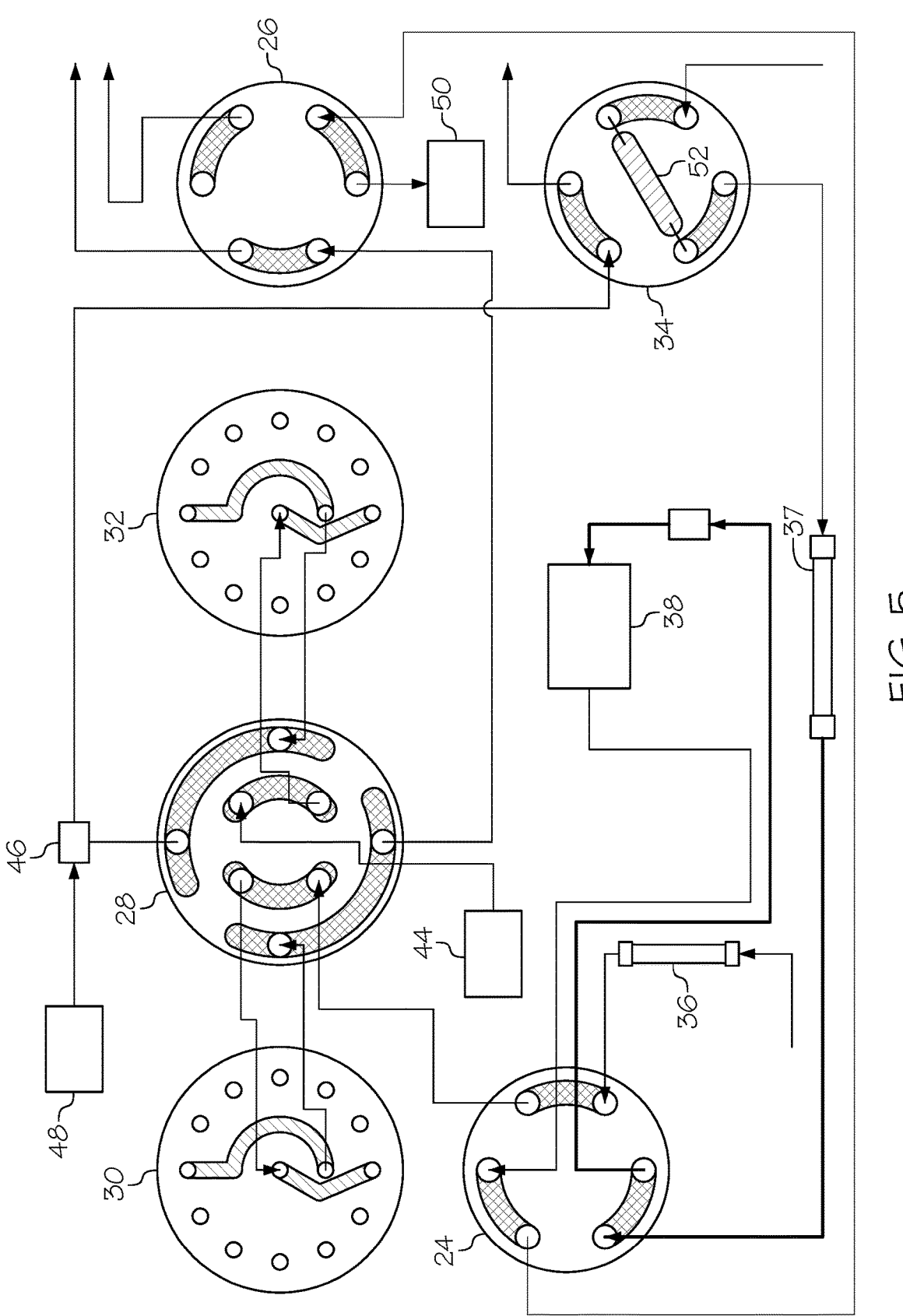

One advantage enabled by the first switching valve 24 is the ability to use the same detector for both first dimension and second dimension separations. For example, FIG. 4 shows the first switching valve 24 in a first valve state such that the mobile phase from the first dimension column 36 flows to the detector 38 and FIG. 5 shows the first switching valve 24 in a second valve state such that the mobile phase from the second dimension column 37 flows to the detector 38. Advantageously, this embodiment avoids the need for a second detector where each detector would be dedicated to just one dimension. In addition, because the detector responses of two detectors can be different even though the detectors may be the same type of detector, a determination of modulation efficiency made using the single detector avoids the need to account for different detector response factors.

Figure 6:
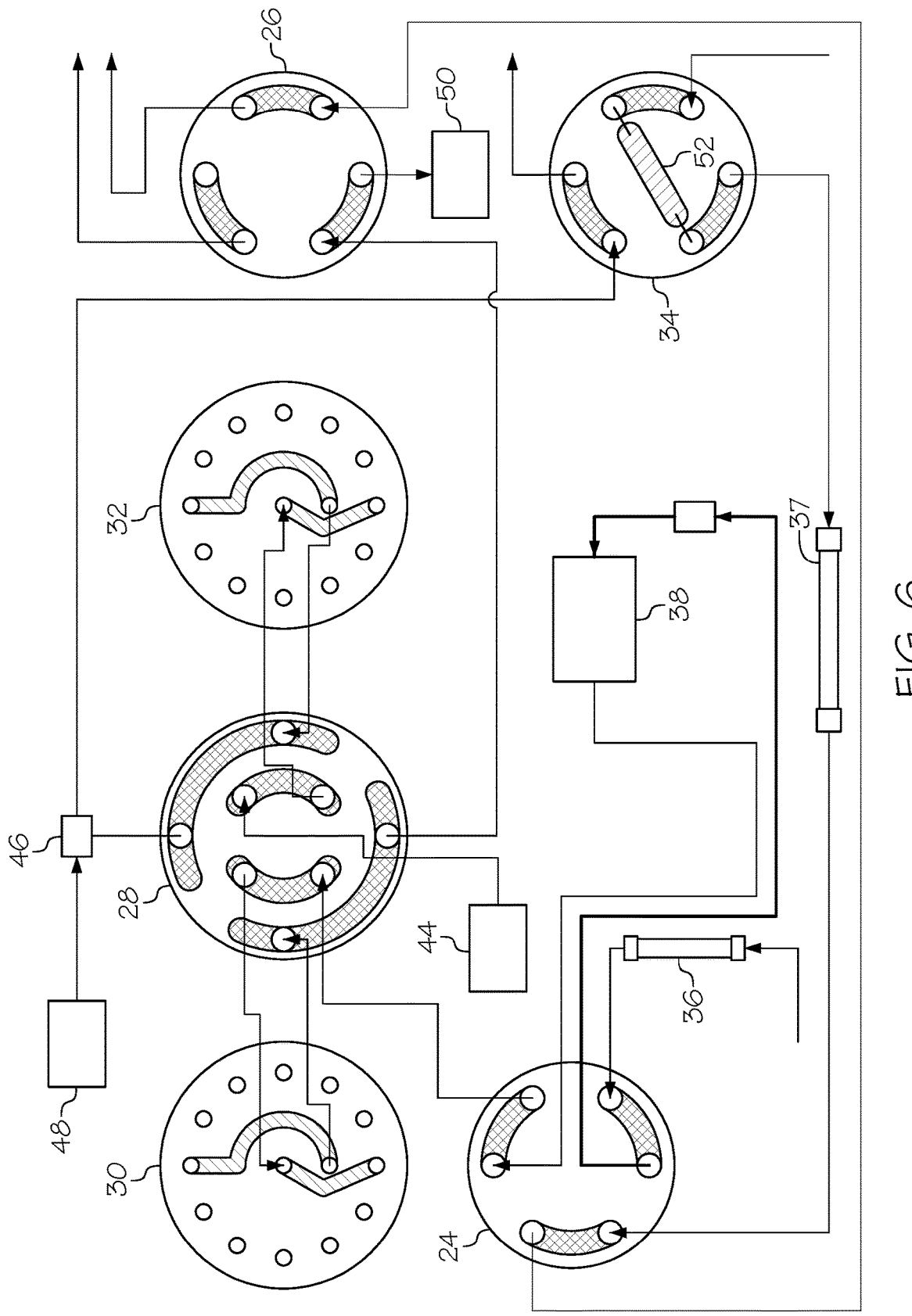

The second switching valve 26 enables the independent use of either dimension with the mass spectrometer detector 50. In non-limiting examples, the mass spectrometer detector 50 may be replaced by another destructive detector such as an evaporative light scattering detector, a charged aerosol detector, a flame ionization detector, etc. FIG. 5 shows the valve configured so that the mobile phase for the first dimension flows through the routing valve 28, first fluidic loop valve 30 and second switching valve 26 to waste while the second dimension mobile phase flows through the second switching valve 26 to the mass spectrometer 50. FIG. 6 shows an alternative configuration in which the first and second switching valves 24 and 26 are reconfigured so that the mobile phase for the first dimension flows through the routing valve 28 and first fluidic loop valve 30 (in bypass state) to the mass spectrometer 50 while the second dimension mobile phase flows to waste.

Normally, accurate knowledge of a time delay defined as the time when an analyte peak arrives at the detector 38 to when the analyte peak arrives at a valve used to redirect, or "capture," the peak in a fluidic loop is required. This time delay is used to determine when to actuate the first or second fluidic loop valve 30 or 32. In some modes of operation, the MDLC system first performs a "scouting separation" according to the configuration shown in FIG. 3 to simplify the timing requirements for the MDLC system. A scouting separation, as used herein, means a separation that is performed for the purpose of determining the start and end times when one or more analyte peaks arrive at and depart from the detector 38. These start and end times are used for subsequent capture separations for similar analyte samples performed while bypassing the detector 38 where flow passes from the first switching valve 24 to the first fluidic loop valve 30. As used herein, a "capture separation" means a separation that is performed to collect one or more analyte peaks in one or more of the fluidic loops coupled to the first or second fluidic loop valves 30 and 32 or a separation performed to collect slices (portions) of one or more analyte peaks where each slice is stored in one of the fluidic loops. There is no need to detect analyte peaks at the detector 50 during a capture separation as the timing for valve actuation is determined from the earlier scouting separation which is described in more detail below.

The MDLC system is configured such that the sum of the volumes of the fluidic paths from the first switching valve 24 to the detector 38 is equal to the sum of the volumes of the fluidic path from the first switching valve 24 to the routing valve 28 and the fluidic path from the routing valve 28 to the first or second fluidic loop switching valve 30 or 32. This can be accomplished, for example, by using segments of external tubing such that the total internal volume of the tubing segments for each group of fluidic paths are equal to the total internal volume of the tubing segments for the other groups of fluidic paths. By way of a specific example, fused silica tubing may be preferred over steel tubing as the former can often be produced with more than an order of magnitude reduction in internal volume variability compared to the latter so that the resulting delay volumes are more accurately matched. Alternatively, less tightly toleranced tubing can be used as long as the tubing segments are evaluated to ensure accurate delay volume matching, as described above. Matched sets of tubing segments to achieve matched delay volumes may be provided to installers in the form of a kit to simplify installation and setup.

During the scouting separation, the time at which an analyte in the eluent from the first-dimension column 36 is first detected and last detected at the detector 38 is determined. Stated alternatively, the times at which the start and end of the analyte peak are sensed at the detector 38 are determined. The start and end times at which other analytes of interest in the eluent are detected can similarly be determined. Due to matching of the volume of fluidic paths, the time delays determined for the traversal of each analyte from the first switching valve 24 to the detector 38 are substantially equal to the time delays for the traversal of each respective analyte to the first fluidic loop valve 24 when the MDLC system is configured as shown in FIG. 5 with the first switching valve is in its alternate valve state. Thus, there is no need for the user to accurately know the volumes of the individual fluidic paths nor is there a need to account for an additional timing offset for operation of the first fluidic loop valve 24 when the MDLC system is operated for capture separations. Consequently, a user may avoid the need to provide a known delay time or volume to the system operational software.

Figure 9:
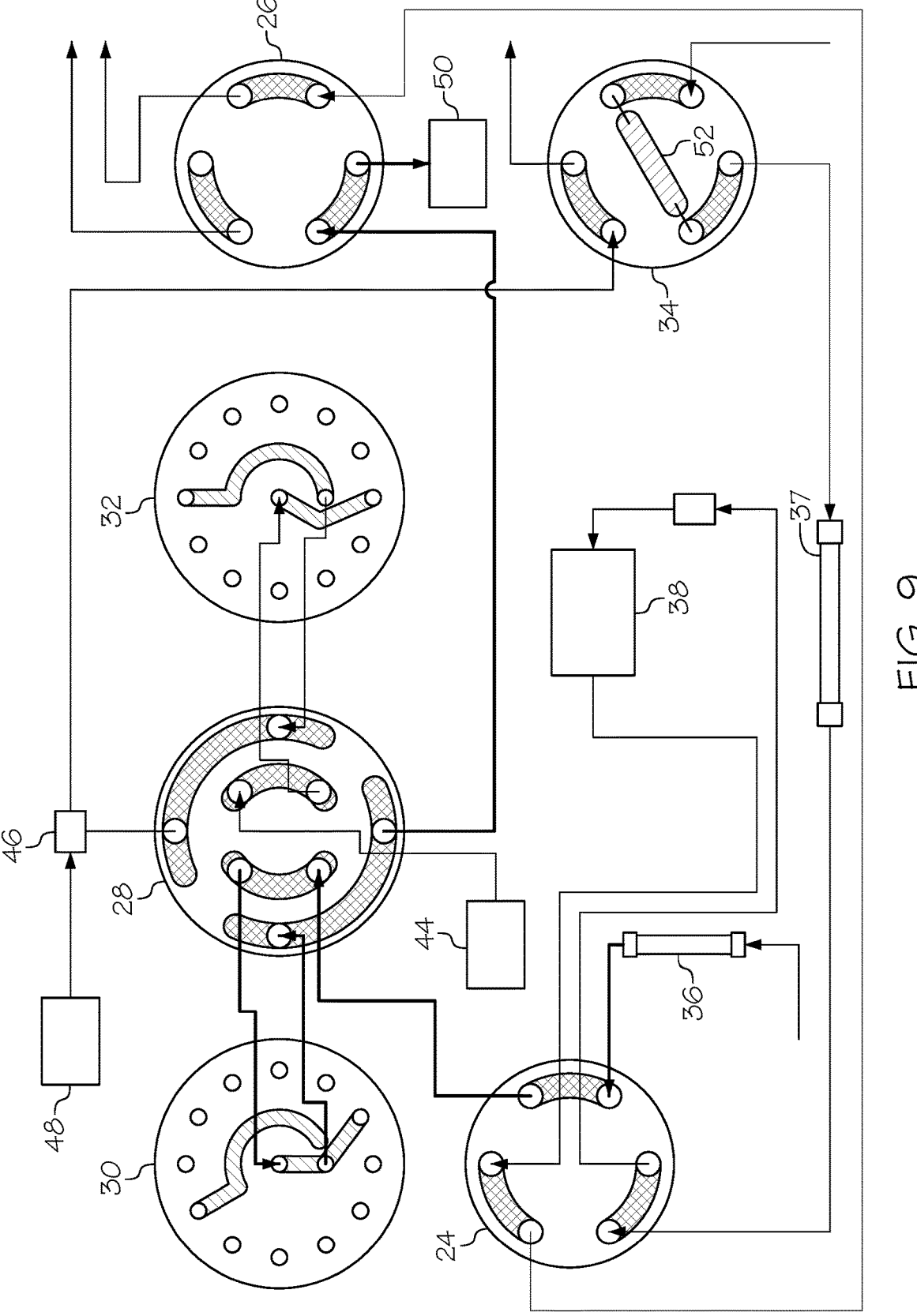
FIG. 9 to FIG. 23 are schematic diagrams of the MDLC system configured for performing various MDLC functions.
Figure 10:
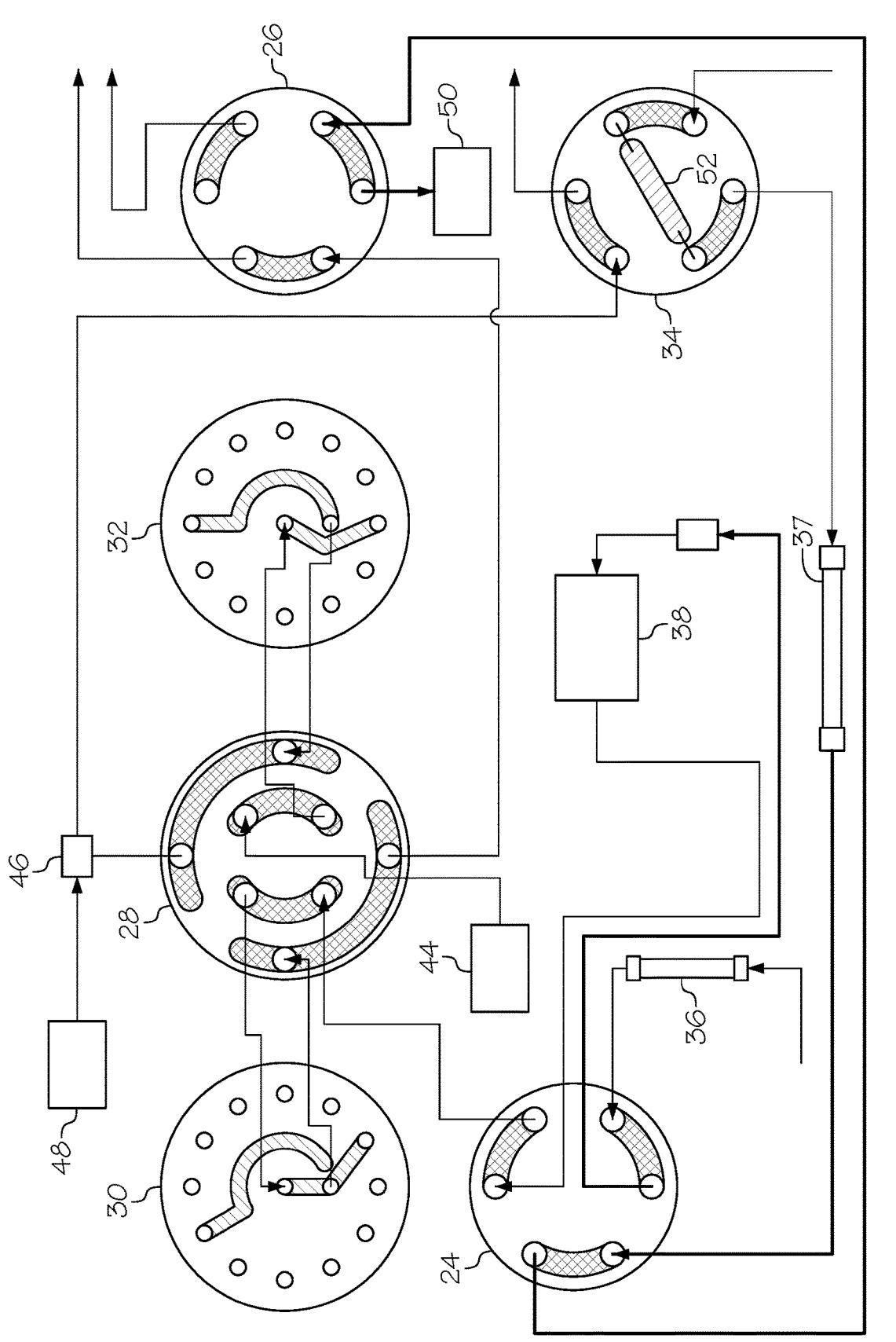

The trap valve 34 includes a trap column 52 coupled between two of the valve ports. The contents of one of the twelve fluidic loops can be pushed out by solvent sourced from the ACD loader 44 and diluted by a diluter 48 at the fluidic tee 46 before flowing to the trap column 52 when the trap valve 34 is configured in an alternate state to that shown in the figure. Subsequently, the trap valve 34 is reconfigured to the illustrated valve state and an elution solvent elutes the analyte peak or slice from the trap column 52, without separation, so that the analyte peak is included in the flow to the second dimension column 37. The mobile phase from the second-dimension column 37 flows through the first switching valve 24 and then to the second switching valve 26 as shown in FIG. 9 so that the detector 38 is used to monitor the second-dimension separation. Alternatively, if the switching valves 24 and 26 are in their alternate valve states, the eluent from the second-dimension column 37 flows through the first and second switching valves 24 and 26 and to the mass spectrometer detector 52, as shown in FIG. 10. The switching valves 24 and 26 can be configured in a state to connect the outlet of the second-dimension column 37 to either the optical detector 38 or the mass spectrometer 50, to both the optical detector 38 and the mass spectrometer 50, or to neither the optical detector 38 and the mass spectrometer 50.

Advantageously, the flow rate of the diluted analyte peak to the trap column 52 can be controlled independent of the other flow rates in the system. Similarly, the flow rate of the mobile phase of the second dimension is independently controllable from the other system flow rates. Thus, the MDLC system is not prohibited from operating the first and second dimensions with significantly different mobile phase flow rates. In addition, mobile phases that are incompatible in one dimension can be used in the other dimension. Further, segments collected from the first dimension which would normally be incompatible with the second dimension due to volume or mobile phase incompatibilities can be used in the second dimension.

An example of a method of operating an MDLC system such as the one described above is now described. The method includes performing the scouting separation, performing a first-dimension separation, transferring a captured analyte peak from the first-dimension separation to the second dimension and performing a second-dimension separation. The steps of transferring a captured analyte peak and performing the second-dimension separation can be repeated for each additional captured analyte peak stored in one of the fluidic loops. Control of the MDLC system is achieved by proper configuration of the valve state for each valve and by actuating the valves to change their valve states at the proper times.

Reference is now made to FIGS. 11 to 22 which depict another example of a method for operating an MDLC system in which a sequence of valve state reconfigurations is performed. A chromatographic separation is performed in a first liquid chromatography dimension and analyte peaks in the first-dimension eluent are stored to await injection into a second liquid chromatography dimension. Unlike the operation of the MDLC system as described above, this method example excludes performing a scouting separation and instead is based on the detection of analyte peak start and end times at the detector 38 to control the actuation of the various valves.

Figure 11:
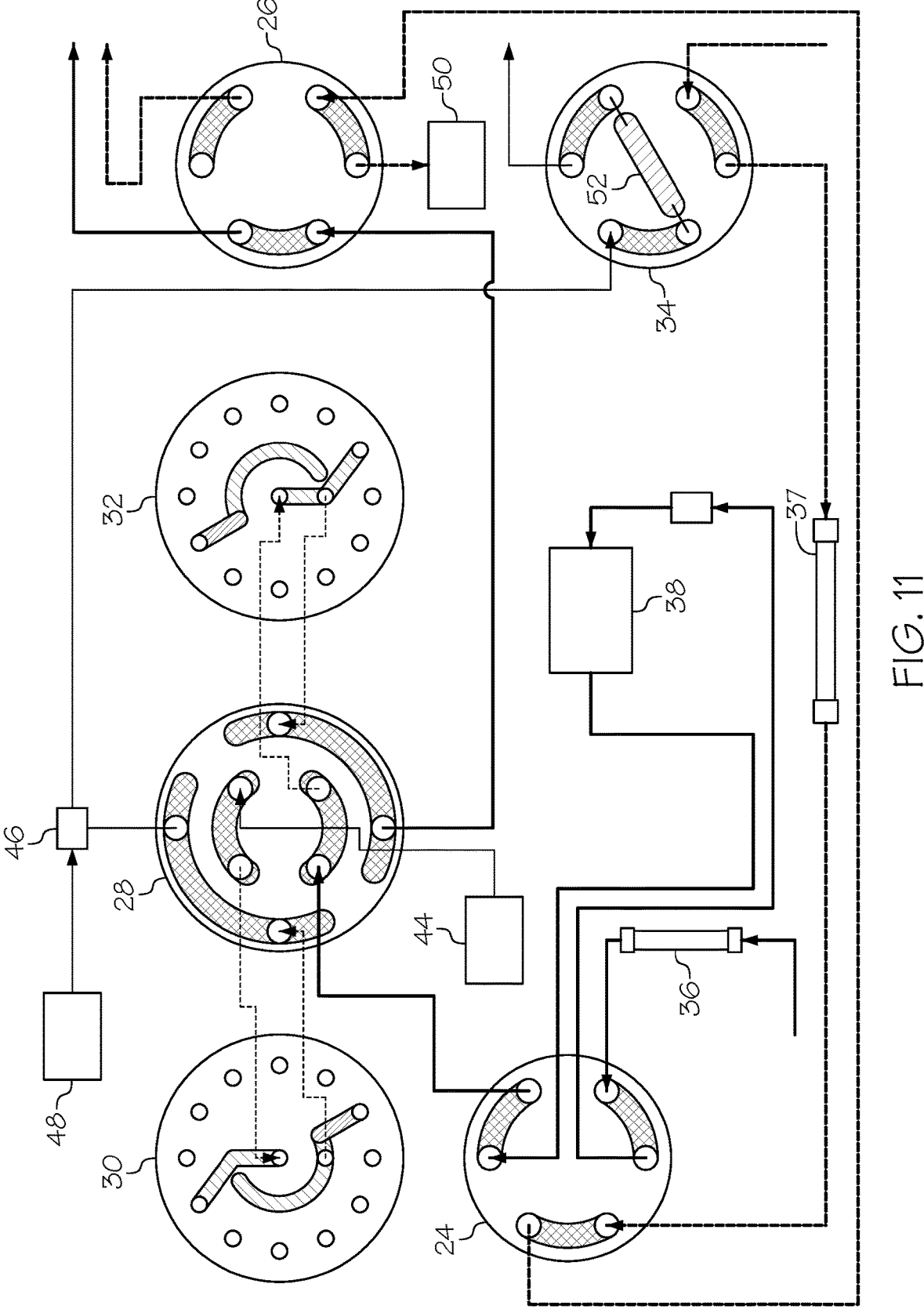

FIG. 11 shows the MDLC system with valve states configured at an initiation of the method. The first-dimension mobile phase flows through the first-dimension column 36 and through the detector 38 before arriving at the first switching valve 24. The mobile phase flows to the routing valve 28 and then to the second fluidic loop valve 32 which is configured in a bypass state. Consequently, the mobile phase does not flow through any of the fluidic loops but instead returns to the routing valve 28 and flows through the second switching valve 26 to waste. In the illustrated valve state, the first fluidic loop valve 30 directs any flow at its inlet port through a fluidic loop coupled between ports 1 and 7.

Figure 12:
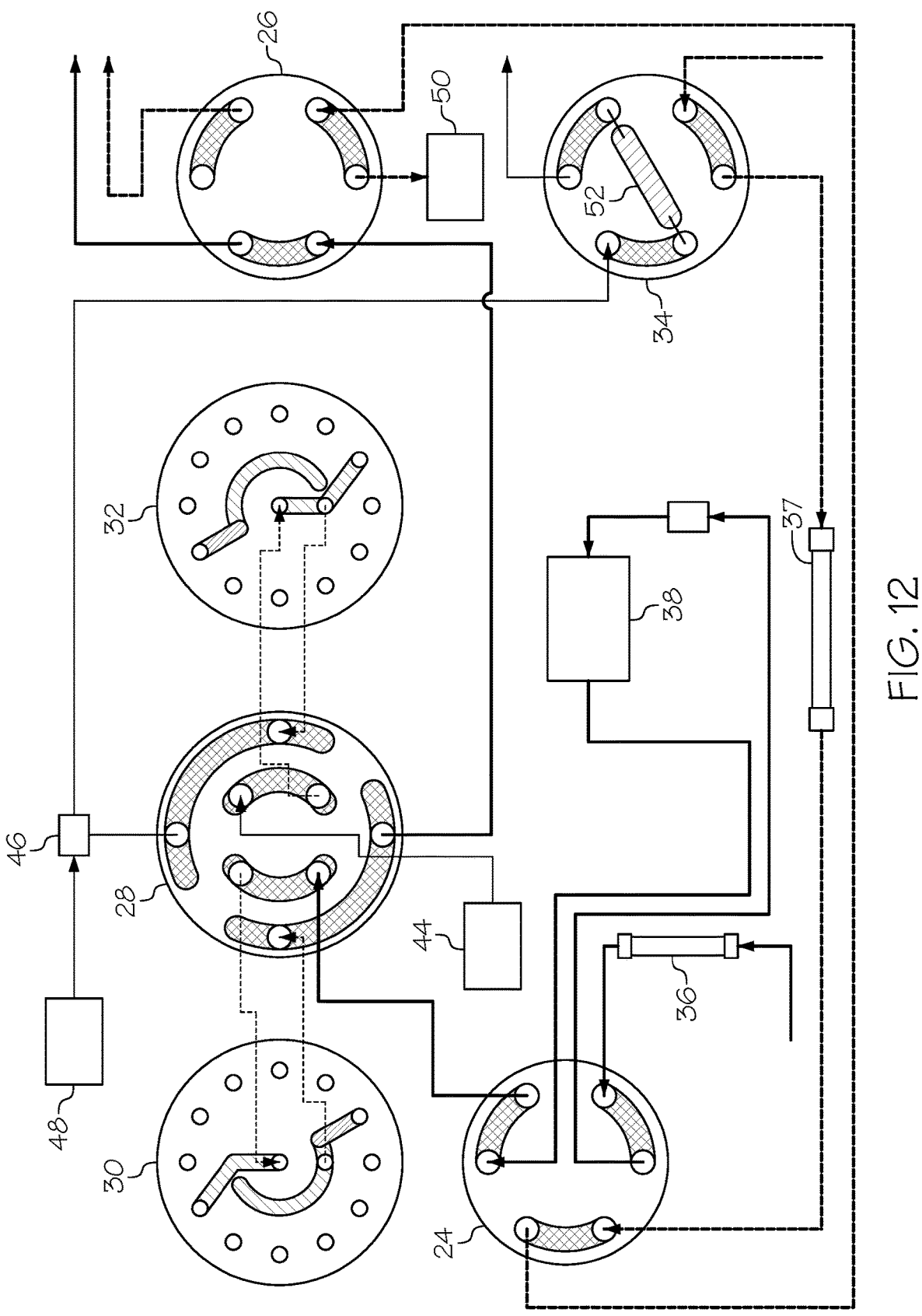
Figure 13:
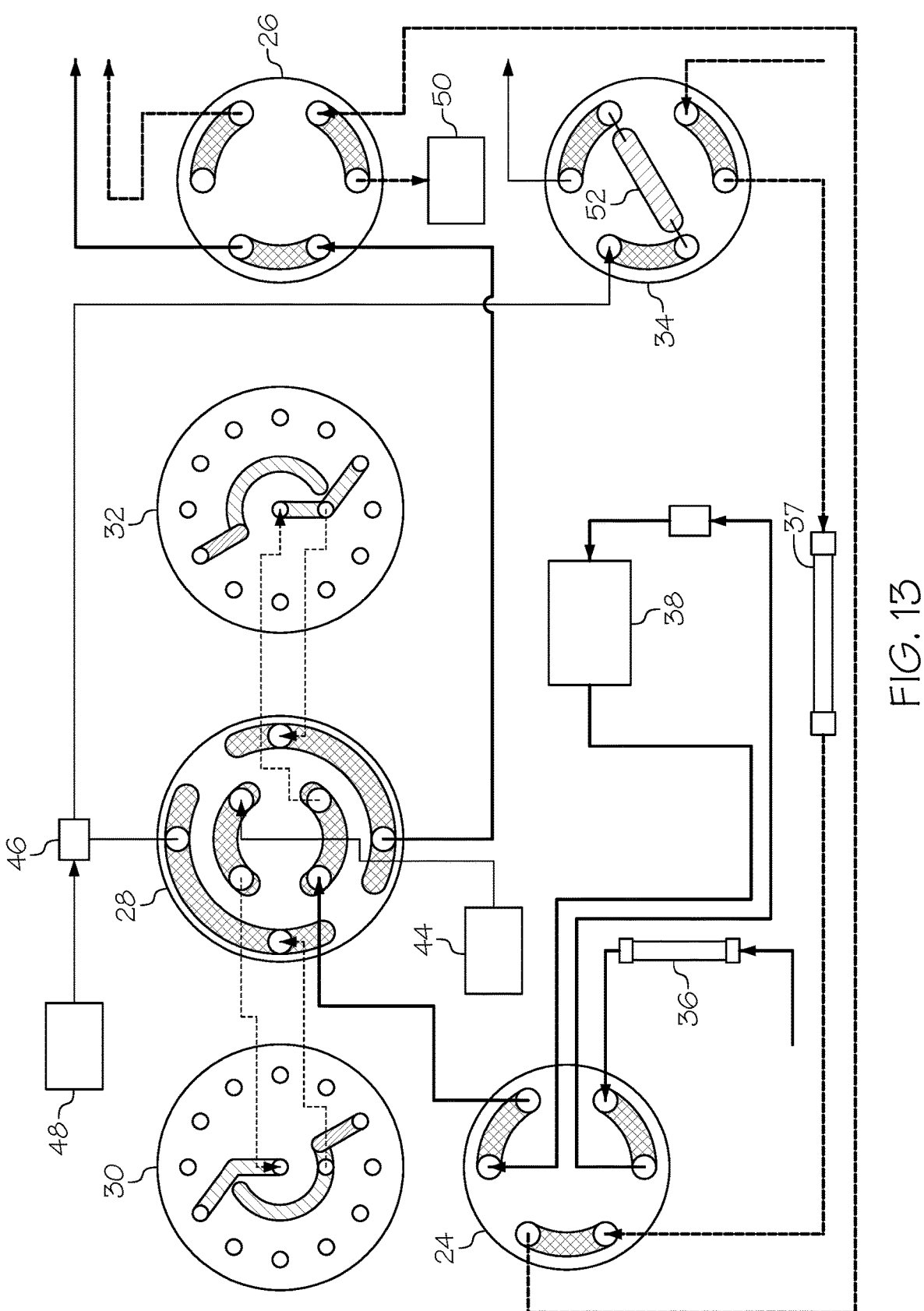

In FIG. 12, the routing valve 28 is switched to its alternate state so that the mobile phase flows to the first switching valve 24, through the fluidic loop between ports 7 and 1, back to the routing valve 28 and through the second switching valve 26 to waste. Next, the routing valve 28 is switched backed to its initial state and the mobile phase is directed through the second fluidic loop valve 32 in its bypass state and to waste, as shown in FIG. 13. The times at which the routing valve 28 is first configured as shown in FIG. 12 and then reconfigured as shown in FIG. 13 are determined such that the entire volume of an analyte peak to be stored is captured in the volume of the fluidic loop. The specific times in the illustrated example are based on the analyte peak start and end times sensed by the detector 38 and knowledge of the delay volumes of the fluidic paths.

Figure 14:
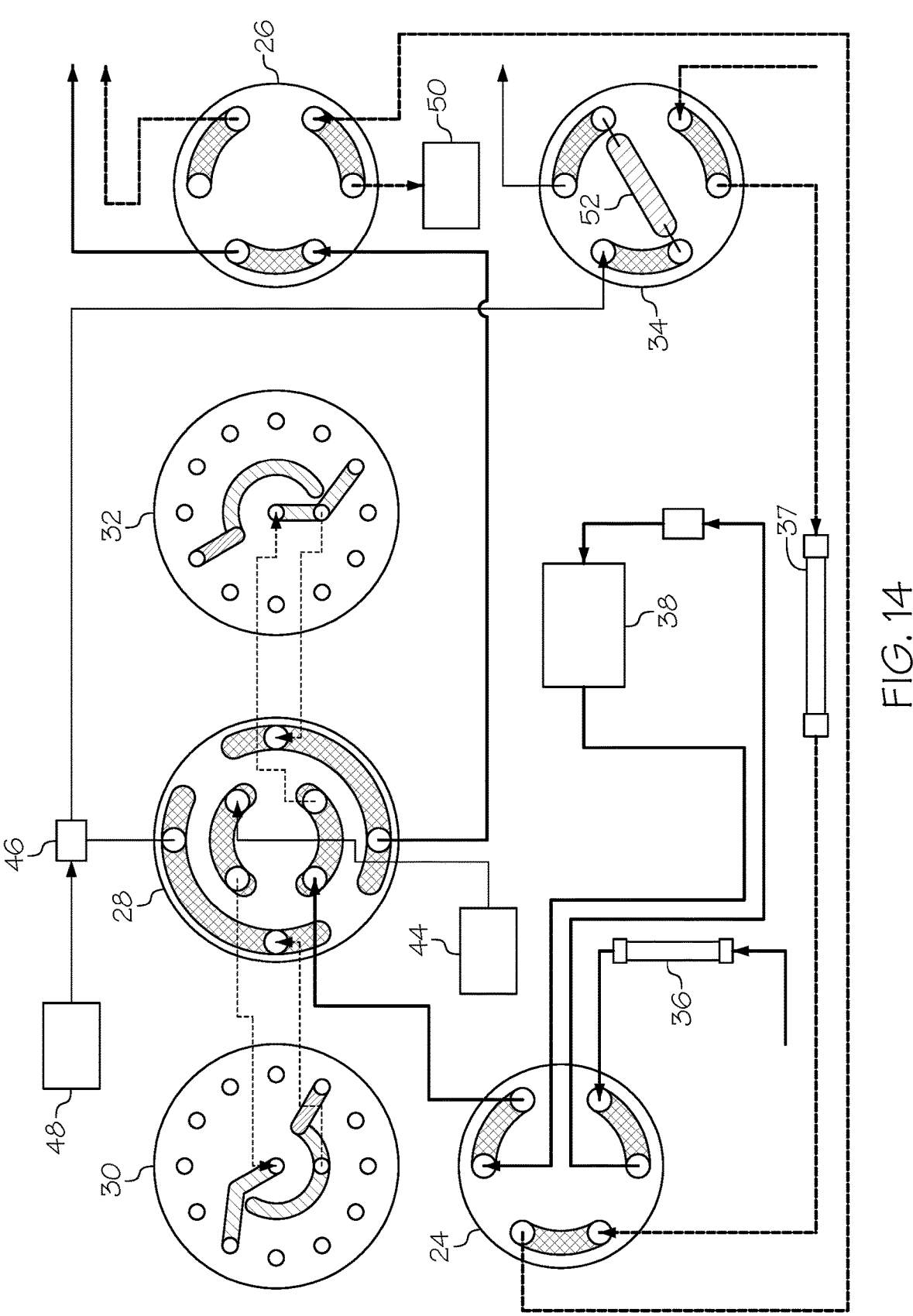
Figure 15:
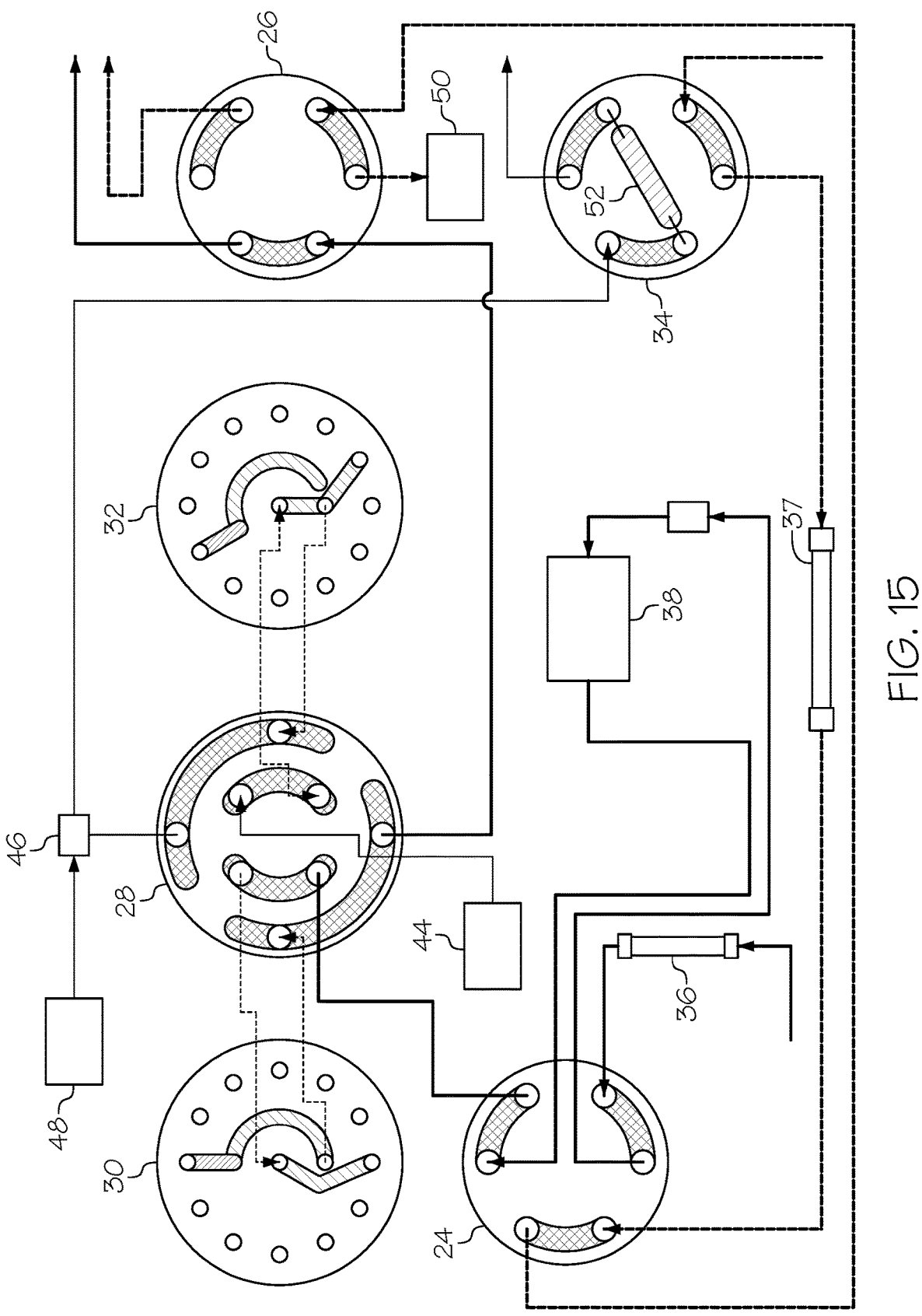

FIG. 14 shows how the MDLC system is configured at a time following termination of a prior analyte capture event. The first fluidic loop valve 30 is switched to the next valve state to enable storage in a second fluidic loop which is coupled between ports 2 and 8. Similar to the process of storing the first analyte peak, the routing valve 28 is then actuated to direct flow at its inlet port through the first fluidic loop valve 30 and the second fluidic loop before a switching of the routing valve 28 to its prior state to complete the process of storing a second analyte peak. Additional analyte peaks may be captured by repeating this process using different fluidic loops. For example, FIG. 15 shows the first fluidic loop valve 30 configured in a valve state to enable capture of an analyte peak in a fluidic loop coupled between ports 6 and 12. Other fluidic loops available for storage include fluidic loops between ports 3 and 9, ports 4 and 10, and ports 5 and 11.

Figure 16:
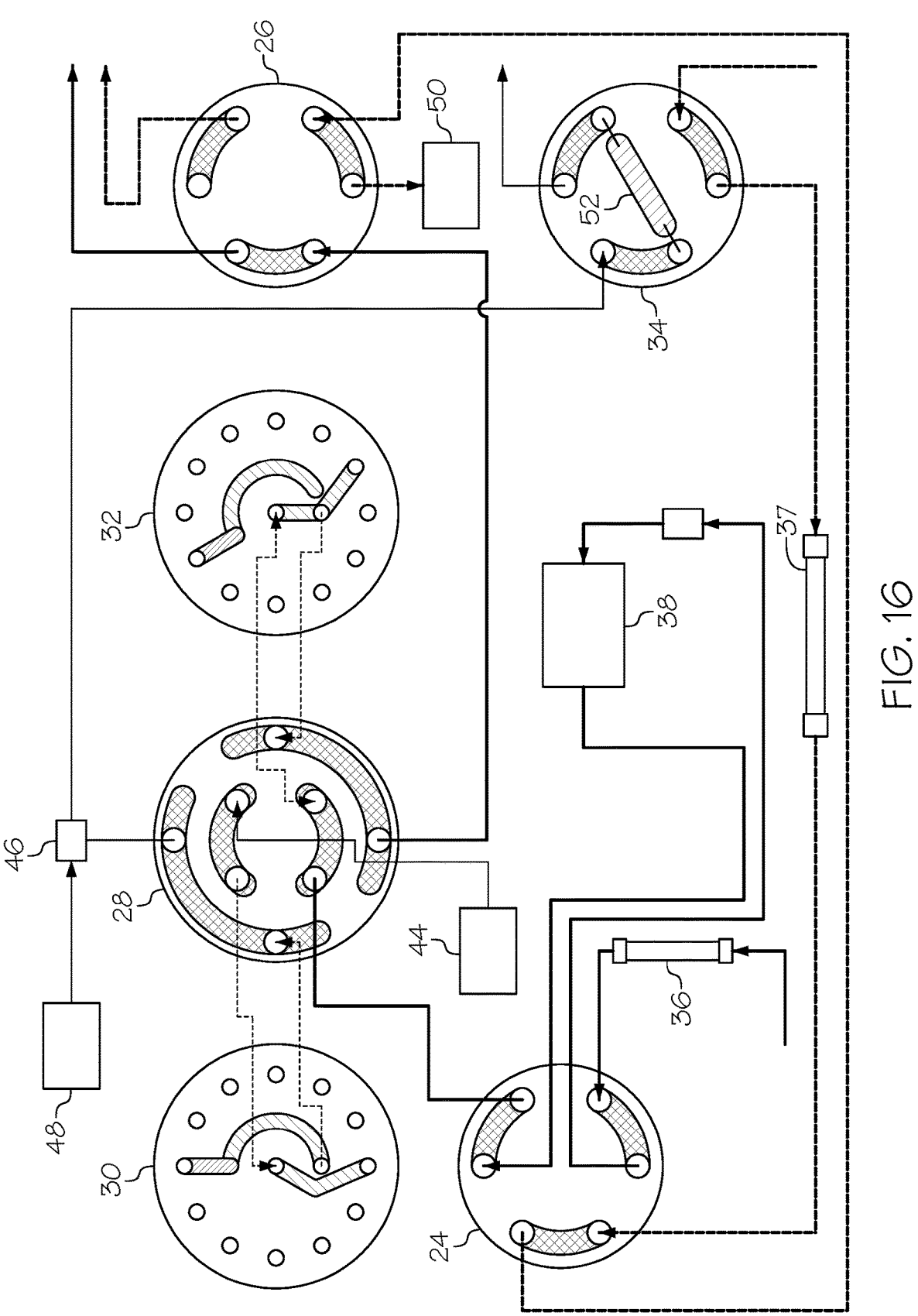
Figure 17:
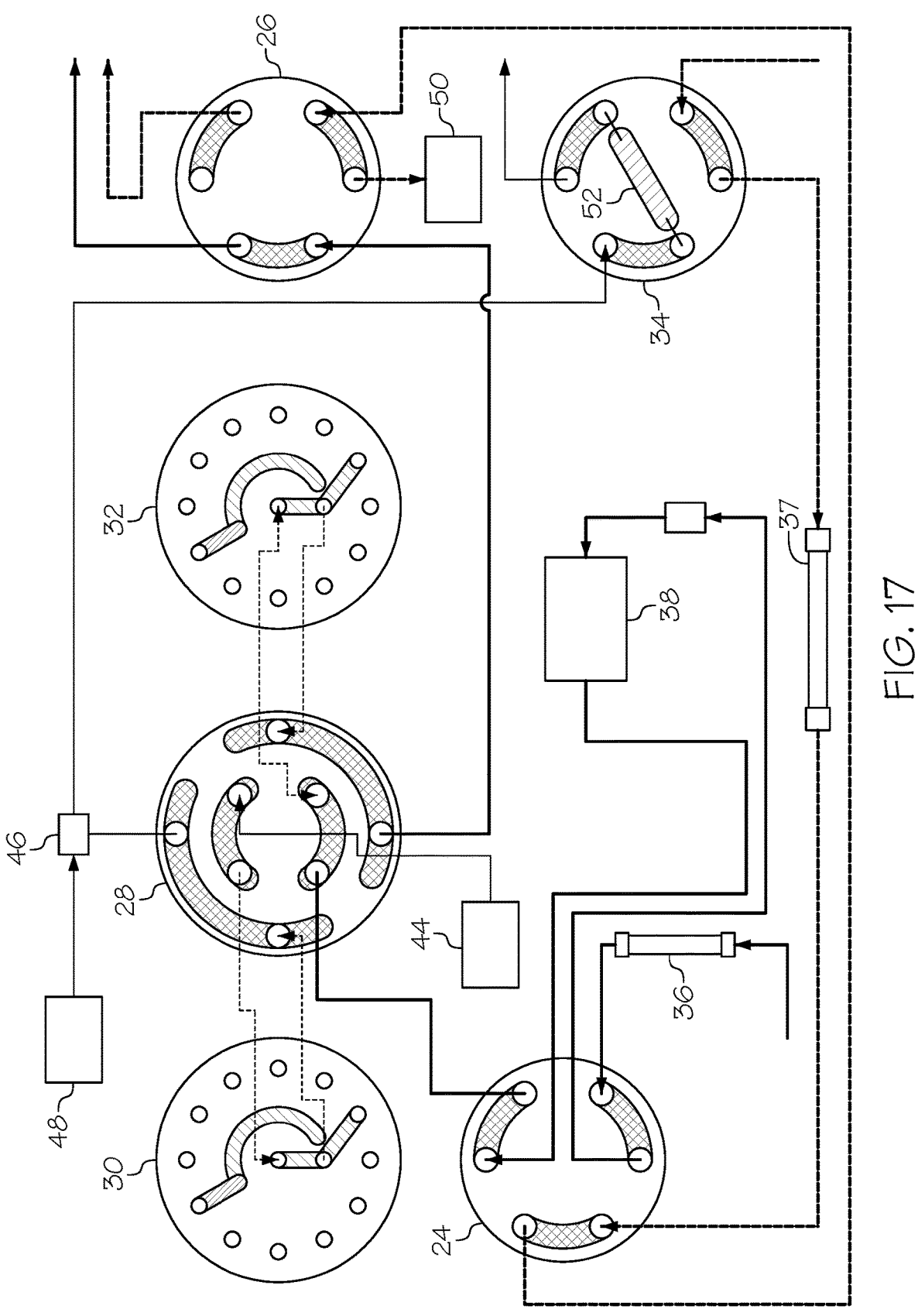
Figure 18:
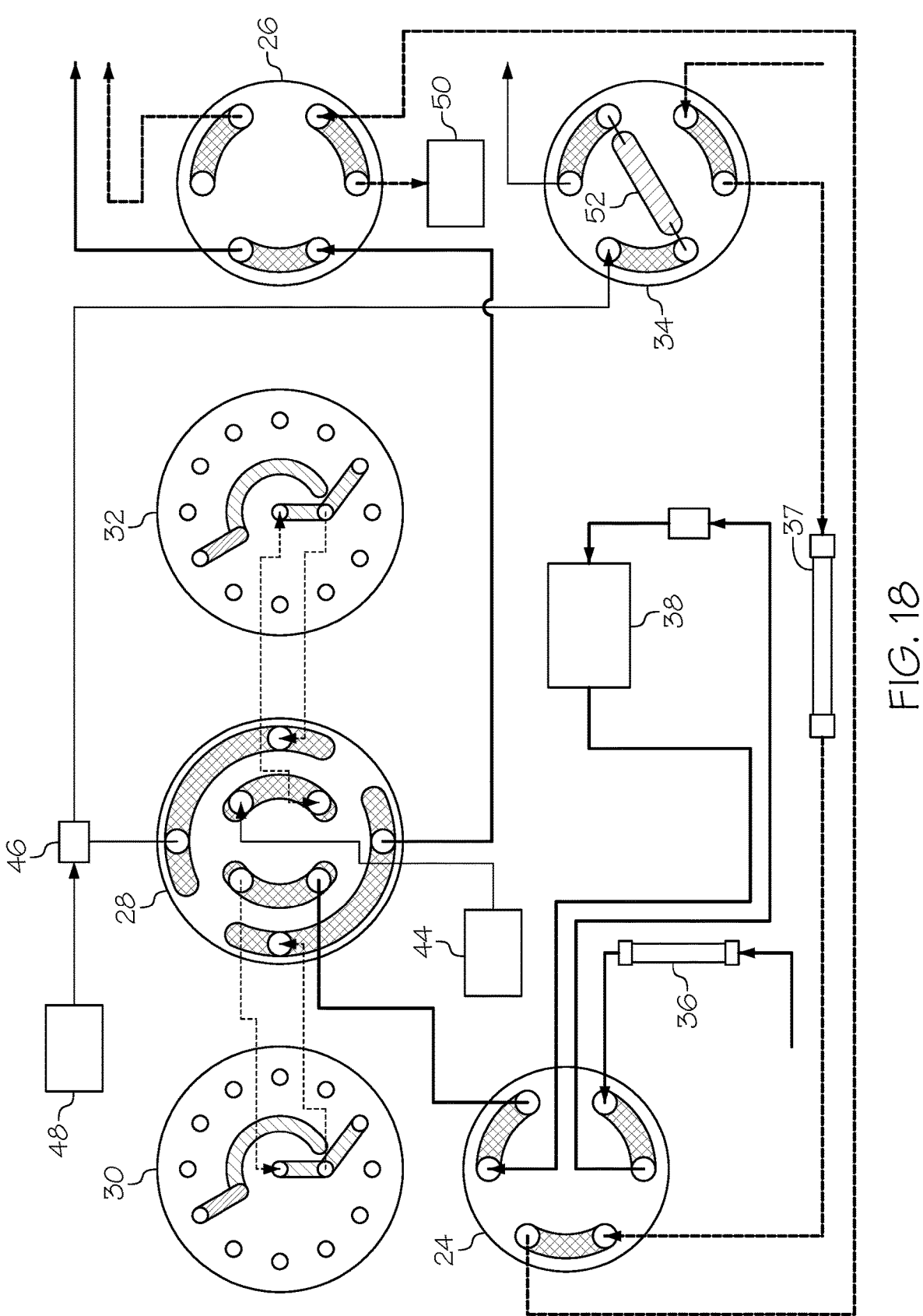
Figure 19:
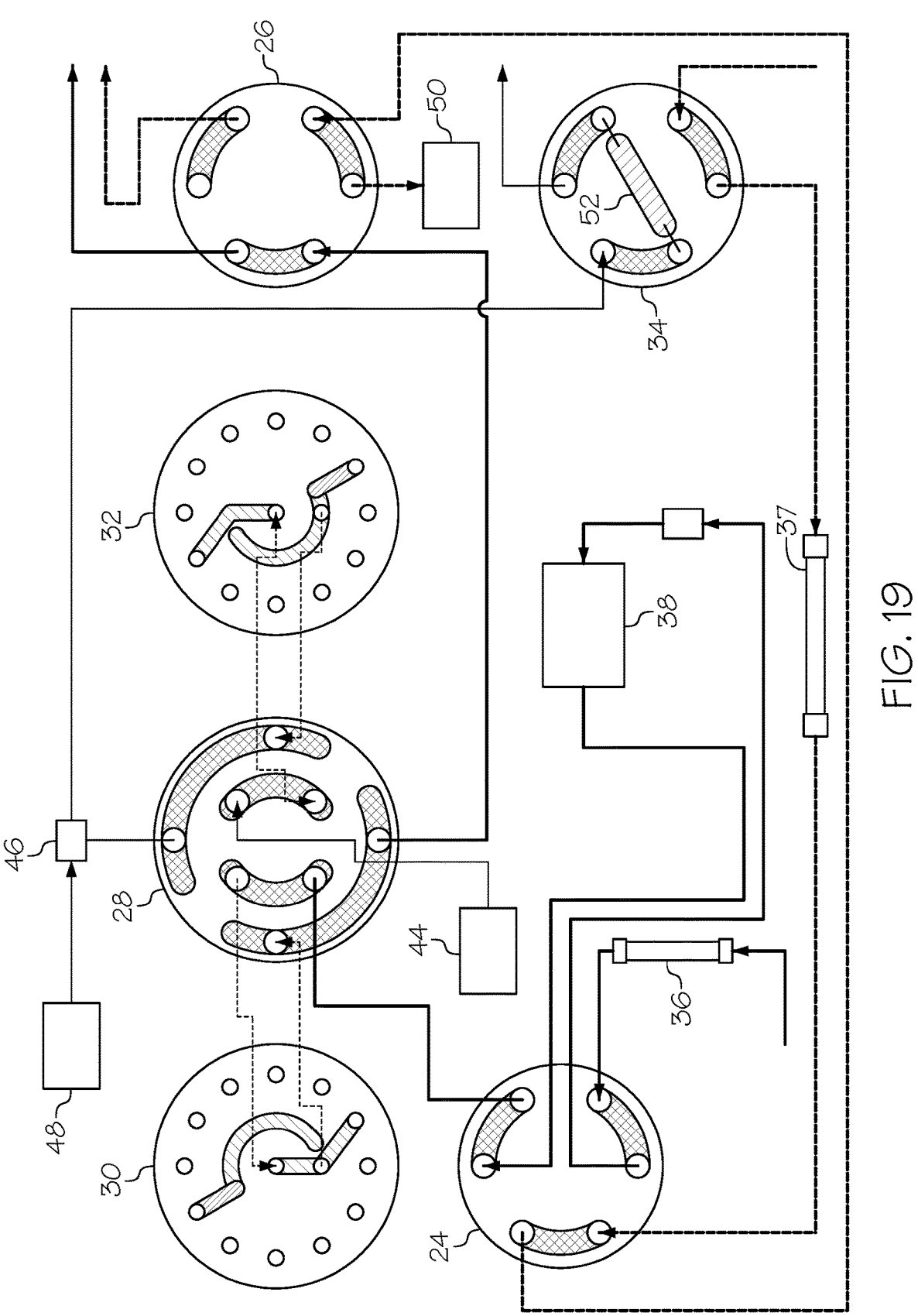
Figure 20:
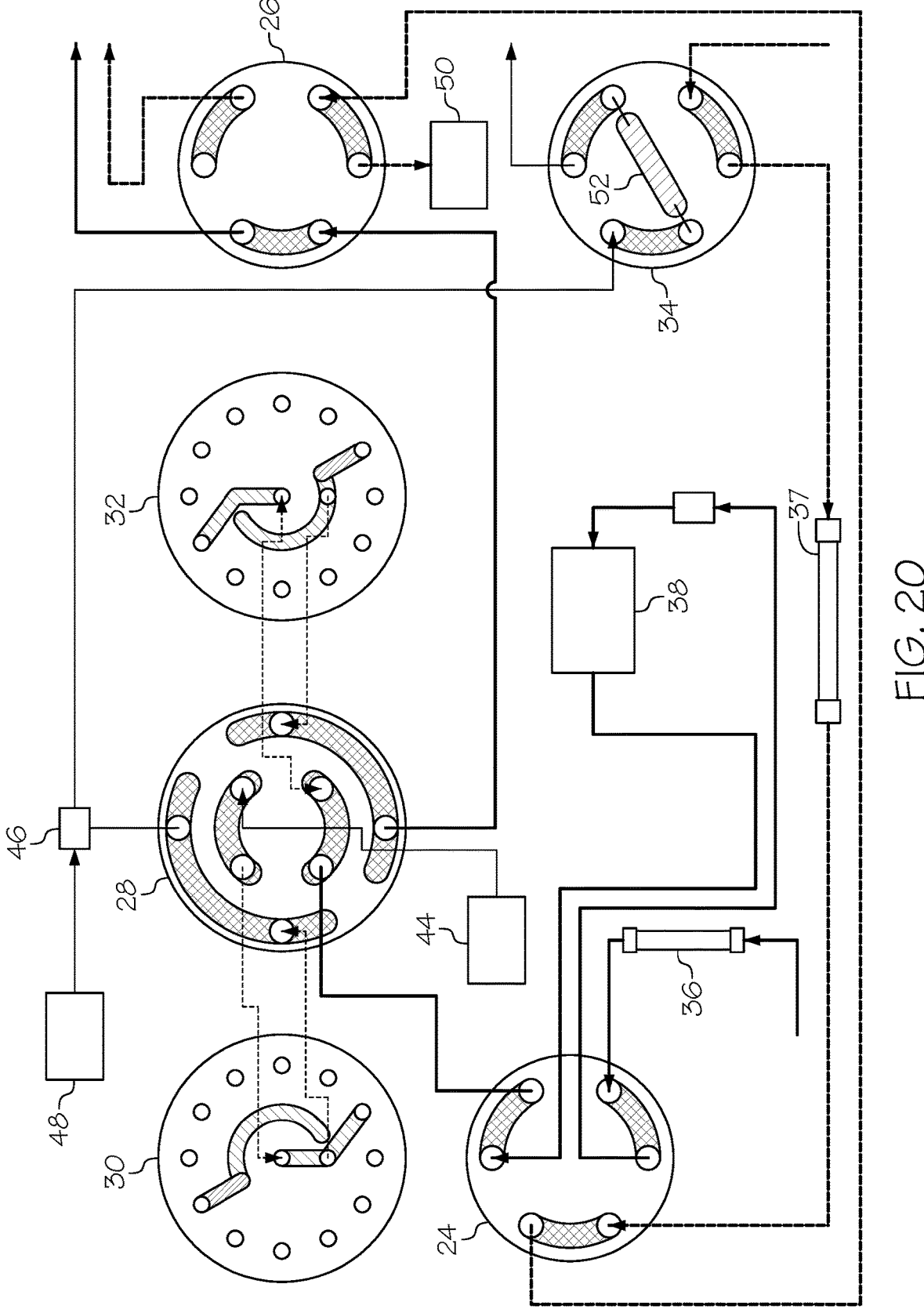
Figure 21:
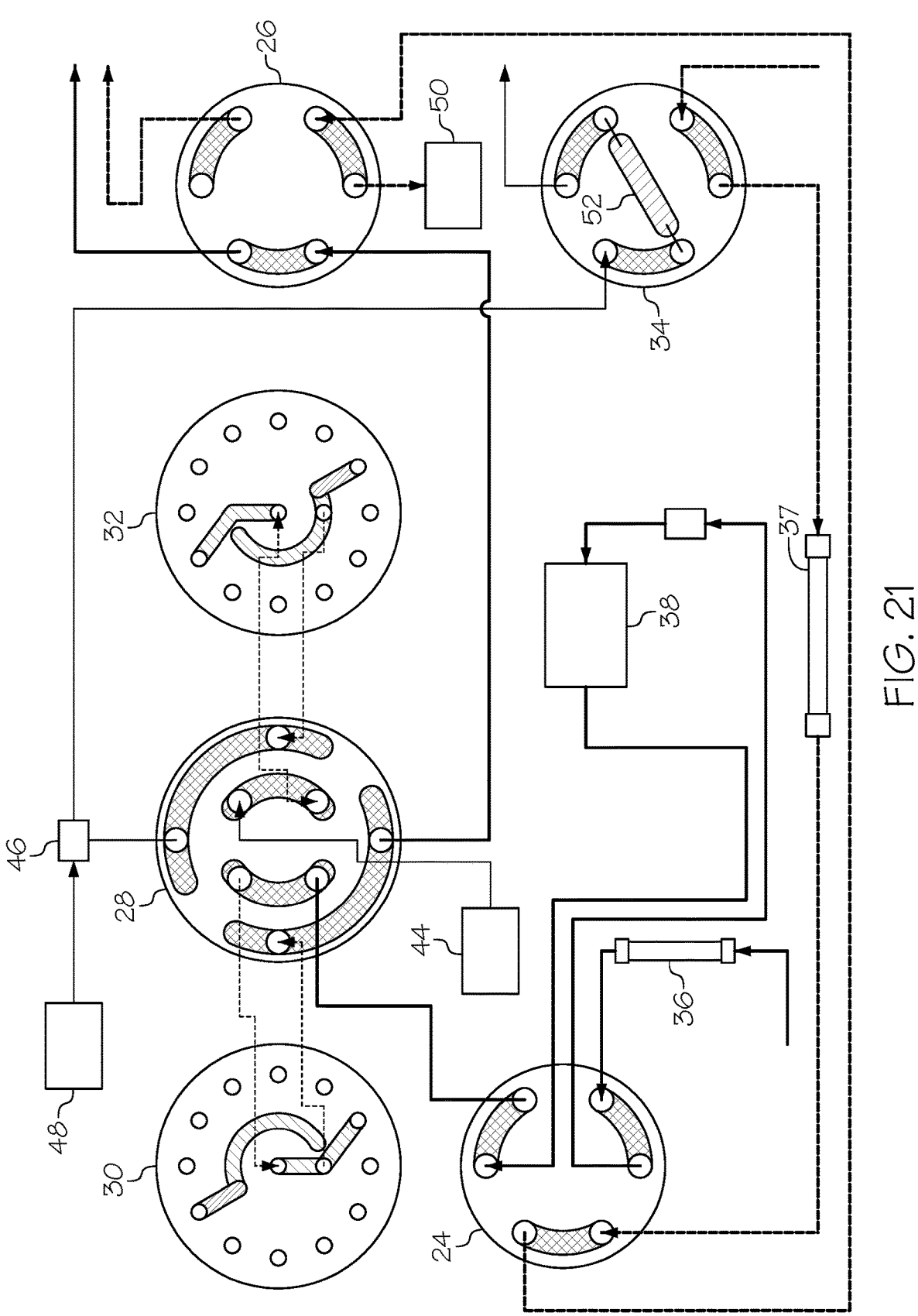
Figure 22:
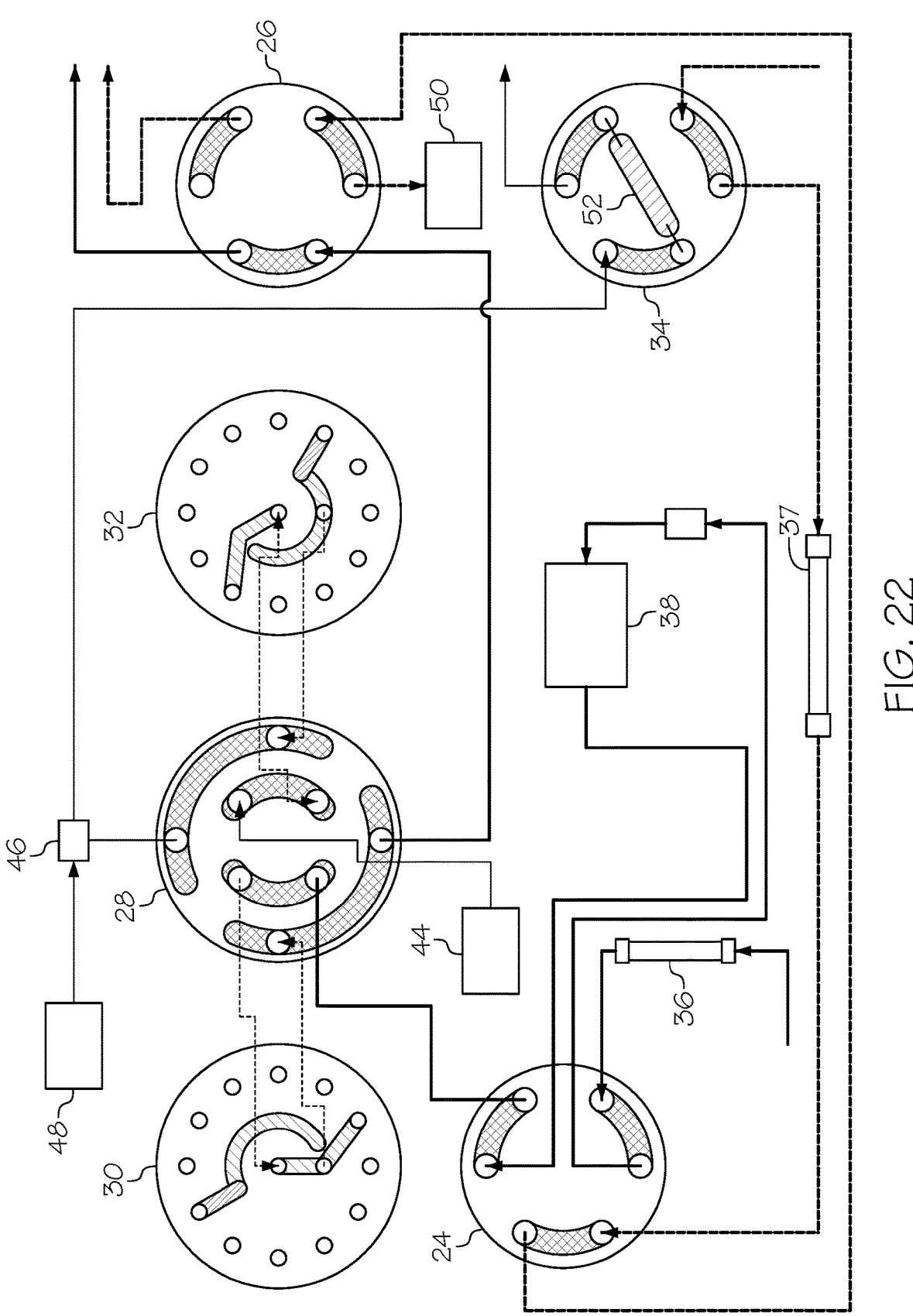

In FIG. 16, the routing valve 28 is switched to direct the mobile phase to the second fluidic loop valve 32 which is in a bypass state so that the mobile phase flows back to the routing valve 28 and to waste. Next, the first fluidic loop valve 30 is switched to its bypass state, as shown in FIG. 17, before the routing valve 28 is switched to its alternate state, as shown in FIG. 18, so that the mobile phase now flows through the first fluidic loop valve 30 and then to waste. The second fluidic loop valve 32 is then actuated to direct flow received at its inlet port through a first fluidic loop which is connected between ports 1 and 7, as shown in FIG. 19. FIG. 20 shows how the routing valve 28 is then switched to direct the mobile phase through the first fluidic loop coupled to the second fluidic loop valve 32 and FIG. 21 shows how the routing valve 28 is switched back to its prior valve state to direct the mobile phase through the first fluidic loop valve 30 and to waste. Thus, the time from when valves are first configured as shown in FIG. 20 to the time when the valves are first configured as shown in FIG. 21 is used to capture the analyte peak in the first fluidic loop. FIG. 22 shows how the second fluidic loop valve 32 can be configured in preparation for capture of another analyte peak in a second fluidic loop coupled to ports 2 and 8. The second fluidic loop valve 32 can similarly be configured to capture analyte peaks using fluidic loops coupling other port pairs on the valve 32.

FIGS. 11 to 22 described above relate to how analyte peaks are captured in the MDLC system to await injection into the second dimension. The following description relates to how the stored analyte peaks are provided to the second-dimension column 37.

Figure 23:
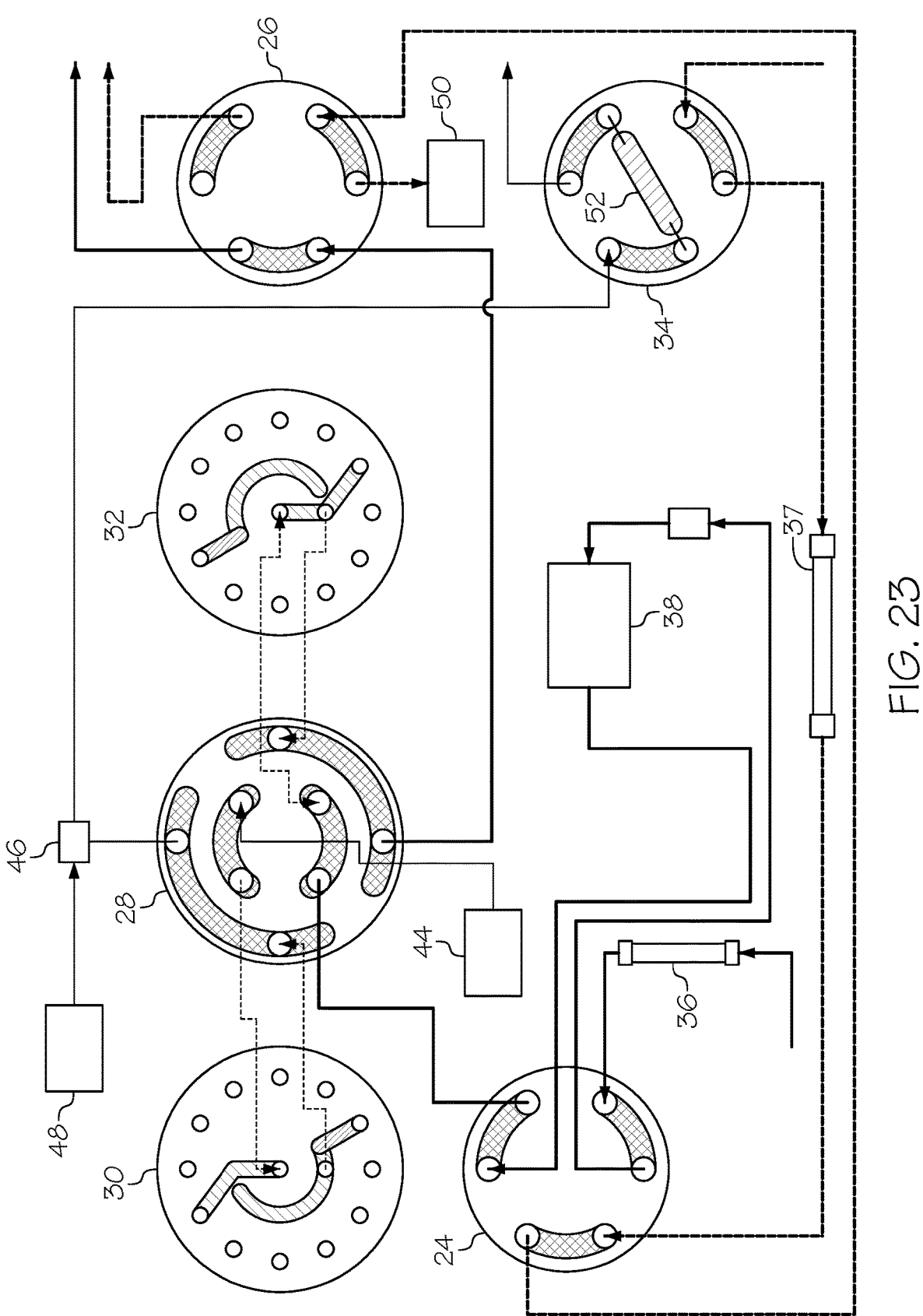

FIG. 23 shows the MDLC system where the mobile phase from the first dimension is directed from the routing valve 28 and second fluidic loop valve 32 (in the bypass state) to waste. Concurrently, a solvent flow from the ACD loader 44 is directed by the routing valve 28 to port 7 of the first fluidic loop valve 24 so that the stored analyte peak in the fluidic loop between ports 1 and 7 is pushed toward the fluidic tee 46 where it may optionally be merged with a flow of a dilution solvent from the ACD diluter module 48.

In the embodiments disclosed above, the various valves are shown with certain arrangements and numbers of ports and internal fluid paths. It will be appreciated that these valves may instead be implemented according to alternative embodiments with different arrangements and/or numbers of ports and internal fluidic paths to achieve similar switching functionality and fluidic routing.

While the technology has been shown and described with reference to specific embodiments, it should be understood by those skilled in the art that various changes in form and detail may be made therein without departing from the scope of the claims.

What is claimed is:

1. A multidimensional liquid chromatography system, comprising:
   a first switching valve;
   a second switching valve in communication with the first switching valve by a first fluidic path defined by tubing having a first end coupled to a first port of the first switching valve and a second end coupled to a first port of the second switching valve;
   a first dimension column and a second dimension column in communication with the first switching valve through a second port and a third port, respectively, of the first switching valve;
   a first detector in communication with the first switching valve through a second fluidic path defined by tubing having a first end coupled to a fourth port of the first switching valve and a second end coupled to a first port of the first detector and a third fluidic path defined by tubing having a first end coupled to a fifth port of the first switching valve and a second end coupled to a second port of the first detector, wherein the first switching valve uses the first detector for detecting an output of the first dimension column and an output of the second dimension column; and
   a second detector in communication with a second port of the second switching valve, the second switching valve enabling an independent use of a first separation of the first dimension column and a second separation of the second dimension column.

2. The multidimensional liquid chromatography system of claim 1, wherein the first switching valve in a first valve state permits a mobile phase to flow from the first dimension column to the first detector, and wherein the first switching valve in a second valve state permits the mobile phase to flow the second dimension column to the first detector.

3. The multidimensional liquid chromatography system of claim 1, wherein the second detector includes a mass spectrometer.

4. The multidimensional liquid chromatography system of claim 1, further comprising:
   a routing valve between the first switching valve and the second switching valve, the routing valve in communication with the first switching valve through a fourth fluidic path defined by tubing having a first end coupled to a sixth port of the first switching valve and a second end coupled to a first port of the routing valve, the routing valve in communication with the second switching valve through a fifth fluidic path defined by tubing having a first end coupled to a third port of the second switching valve and a second end coupled to a second port of the routing valve; and
   a first fluidic loop valve in communication with the routing valve through a sixth fluidic path defined by tubing having a first end coupled to a third port of the routing valve and a second end coupled to a first port of the first fluidic loop valve, wherein a volume of the second fluidic path is substantially equal to a sum of a volume of the fourth fluidic path and a volume of the sixth fluidic path.

5. The multidimensional liquid chromatography system of claim 4, further comprising a second fluidic loop valve in communication with the routing valve through a seventh fluidic path defined by tubing coupling the routing valve to the second fluidic loop valve, wherein the volume of the second fluidic path is substantially equal to a sum of a volume of the fourth fluidic path and the seventh fluidic path.

6. The multidimensional liquid chromatography system of claim 5, wherein the second fluidic loop valve is configured in a bypass state, wherein a first dimension mobile phase flows through the first dimension column and through the first detector before arriving at the first switching valve, wherein the mobile phase flows to the routing valve and then to the second fluidic loop valve such that the mobile phase returns to the routing valve and flows through the second switching valve to waste instead of flowing through any of the first through seventh fluidic loops.

7. The multidimensional liquid chromatography system of claim 4, wherein the first fluidic loop valve is configured in a bypass state, and directs a flow of eluent to the routing valve, which routes the fluid of eluent to the second switching valve to the second detector.

8. The multidimensional liquid chromatography system of claim 1, wherein in a first state of the first and second switching valves, a mobile phase from the second dimension column flows through the first switching valve and then to the second switching valve so that the first detector is used to monitor a second dimension separation, and in a second state of the first and second switching valves, an eluent from the second dimension column flows through the first and second switching valves and to the second detector.

9. The multidimensional liquid chromatography system of claim 1, wherein the first and second switching valves are configured in a first state to connect an outlet of the second dimension column to either, both, or none of the first detector or the second detector.

10. A multidimensional liquid chromatography system, comprising:

a first switching valve;

a second switching valve in communication with the first switching valve by a first fluidic path defined by tubing having a first end coupled to a first port of the first switching valve and a second end coupled to a first port of the second switching valve;

a first dimension column and a second dimension column in communication with the first switching valve through a second port and a third port, respectively, of the first switching valve;

a first detector in communication with the first switching valve through a second fluidic path defined by tubing having a first end coupled to a fourth port of the first switching valve and a second end coupled to a first port of the first detector and a third fluidic path defined by tubing having a first end coupled to a fifth port of the first switching valve and a second end coupled to a second port of the first detector; and a second detector in communication with a second port of the second switching valve, wherein in a first state of the first and second switching valves, a mobile phase from the second dimension column flows through the first switching valve and then to the second switching valve so that the first detector is used to monitor a second dimension separation, and in a second state of the first and second switching valves, an eluent from the second dimension column flows through the first and second switching valves and to the second detector.

11. The multidimensional liquid chromatography system of claim 10, wherein the first and second switching valves are configured in the first state to connect an outlet of the second dimension column to either, both, or none of the first detector or the second detector.

12. The multidimensional liquid chromatography system of claim 10, wherein the first switching valve in a first valve state permits a mobile phase to flow from the first dimension column to the first detector, and wherein the first switching valve in a second valve state permits the mobile phase to flow through the second dimension column to the first detector.

13. The multidimensional liquid chromatography system of claim 10, wherein the second detector includes a mass spectrometer.

14. The multidimensional liquid chromatography system of claim 10, further comprising:

a routing valve between the first switching valve and the second switching valve, the routing valve in communication with the first switching valve through tubing having a first end coupled to the first switching valve and a second end coupled to a first port of the routing valve, the routing valve in communication with the second switching valve by tubing having a first end coupled to the second switching valve and a second end coupled to a second port of the routing valve; and a first fluidic loop valve in communication with the routing valve through tubing having a first end coupled to a third port of the routing valve and a second end coupled to a first port of the first fluidic loop valve.

15. A multidimensional liquid chromatography system, comprising:

a first switching valve;

a second switching valve in communication with the first switching valve by a first fluidic path defined by tubing having a first end coupled to a first port of the first switching valve and a second end coupled to a first port of the second switching valve;

a first dimension column and a second dimension column in communication with the first switching valve through a second port and a third port, respectively, of the first switching valve;

a first detector in communication with the first switching valve through a second fluidic path defined by tubing having a first end coupled to a fourth port of the first switching valve and a second end coupled to a first port of the first detector and a third fluidic path defined by tubing having a first end coupled to a fifth port of the first switching valve and a second end coupled to a second port of the first detector, wherein in a first state the first and second switching valves are configured to connect an outlet of the second dimension column to the first detector; and a second detector in communication with a second port of the second switching valve, wherein in a second state the first and second switching valves are configured to connect the outlet of the second dimension column to the second detector.

16. The multidimensional liquid chromatography system of claim 15, wherein the first switching valve in a first valve state permits a mobile phase to flow from the first dimension column to the first detector, and wherein the first switching valve in a second valve state permits the mobile phase to flow through the second dimension column to the first detector.

17. The multidimensional liquid chromatography system of claim 15, wherein the second detector includes a mass spectrometer.

18. The multidimensional liquid chromatography system of claim 15, further comprising:

a routing valve between the first switching valve and the second switching valve, the routing valve in communication with the first switching valve through tubing having a first end coupled to the first switching valve and a second end coupled to a first port of the routing valve, the routing valve in communication with the second switching valve by tubing having a first end coupled to the second switching valve and a second end coupled to a second port of the routing valve; and a first fluidic loop valve in communication with the routing valve through tubing having a first end coupled to a third port of the routing valve and a second end coupled to a first port of the first fluidic loop valve.

19. The multidimensional liquid chromatography system of claim 15, further comprising a second fluidic loop valve in communication with the routing valve through tubing coupling the routing valve to the second fluidic loop valve.

\* \* \* \* \*